(12) United States Patent
Ok et al.

(10) Patent No.: US 11,586,155 B2
(45) Date of Patent: Feb. 21, 2023

(54) METHOD FOR DETERMINING WATCH FACE IMAGE AND ELECTRONIC DEVICE THEREFOR

(71) Applicant: SAMSUNG ELECTRONICS CO., LTD., Suwon-si (KR)

(72) Inventors: Joonho Ok, Suwon-si (KR); Dayun Ha, Suwon-si (KR); Youngjae Meen, Suwon-si (KR); Seunghyuck Heo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 311 days.

(21) Appl. No.: 16/794,672

(22) Filed: Feb. 19, 2020

(65) Prior Publication Data

US 2020/0264567 A1 Aug. 20, 2020

(30) Foreign Application Priority Data

Feb. 19, 2019 (KR) .......................... 10-2019-0019531

(51) Int. Cl.
*G04G 21/02* (2010.01)
*G06V 10/56* (2022.01)
*G06V 20/20* (2022.01)
*G06T 7/90* (2017.01)
*H04B 1/3827* (2015.01)

(52) U.S. Cl.
CPC ............... *G04G 21/02* (2013.01); *G06T 7/90* (2017.01); *G06V 10/56* (2022.01); *G06V 20/20* (2022.01); *G06V 2201/02* (2022.01); *H04B 1/385* (2013.01)

(58) Field of Classification Search
CPC .......... G04G 21/02; G06T 7/90; G06V 20/20; G06V 10/56; G06V 2201/02; H04B 1/385
See application file for complete search history.

(56) References Cited

U.S. PATENT DOCUMENTS

| 9,747,279 | B2 | 8/2017 | Boies et al. | |
| 2014/0307084 | A1* | 10/2014 | Zontrop | .................... F41H 3/00 |
| | | | | 348/121 |
| 2017/0068225 | A1* | 3/2017 | Chen | ...................... G04G 19/00 |

(Continued)

FOREIGN PATENT DOCUMENTS

| CN | 107977247 | 5/2018 |
| JP | 6311216 | 4/2018 |

(Continued)

OTHER PUBLICATIONS

Extended Search Report and Written opinion dated Feb. 1, 2022 in counterpart European Patent Application No. EP20760060.2.

(Continued)

*Primary Examiner* — Xin Sheng

(74) *Attorney, Agent, or Firm* — Nixon & Vanderhye, P.C.

(57) ABSTRACT

An aspect of the disclosure is to determine a watch face image, and an operation method of an electronic device according to various embodiments may include: acquiring an image using a camera of the electronic device; displaying a watch face preview matching the acquired image on a display of the electronic device; determining a watch face image from the watch face preview; controlling a transceiver of the electronic device to transmit the watch face image to a smart watch; and applying the watch face image to the smart watch.

22 Claims, 17 Drawing Sheets

(56) References Cited

U.S. PATENT DOCUMENTS

2017/0262247 A1\* 9/2017 Yoganandan ......... G06F 3/1446
2018/0348814 A1 12/2018 Meen et al.

FOREIGN PATENT DOCUMENTS

| KR | 10-2016-0044285 | | 4/2016 |
|---|---|---|---|
| KR | 10-1623273 | | 5/2016 |
| KR | 10-2016-0123937 | | 10/2016 |
| KR | 10-1686451 | | 12/2016 |
| KR | 101686451 | | 12/2016 |
| KR | 101686451 B1 | * | 12/2016 |
| KR | 10-2017-0026007 | | 3/2017 |
| KR | 10-2018-0089208 | | 8/2018 |

OTHER PUBLICATIONS

Black, Marie, "How to Make an Android Watch Face Using Any Image," Jan. 11, 2018, retrieved from the Internet: URL:https://www.techadvisor.com/how-to/google-android/how-make-android-watch-face-3668865/ [retrieved on Jan. 24, 2022], 7 pages.

International Search Report and Written Opinion dated Jun. 17, 2020 in counterpart International Patent Application No. PCT/KR2020/002381.

First Office Action dated Oct. 31, 2022 in Chinese Patent Application No. CN202080015188.0 and English-language translation.

\* cited by examiner

METHOD FOR DETERMINING WATCH FACE IMAGE AND ELECTRONIC DEVICE THEREFOR

CROSS-REFERENCE TO RELATED APPLICATION

This application is based on and claims priority under 35 U.S.C. § 119 to Korean Patent Application No. 10-2019-0019531, filed on Feb. 19, 2019, in the Korean Intellectual Property Office, the disclosure of which is incorporated by reference herein in its entirety.

BACKGROUND

1) Field

The disclosure relates to a method for determining a watch face image and an electronic device therefor.

2) Description of Related Art

As technology advances, wearable devices and related accessories are being developed. In particular, smart watches among wearable devices are closely related to fashion of users, and markets in the field of smart watches and accessories (e.g., straps) thereof are emerging.

Smart watches, among other wearable devices, include many fashion-related elements. For example, elements of a smart watch, which are related to fashion, may include a watch face image displayed via the smart watch and a strap of the smart watch. However, if a watch face image and a strap are set manually, the watch face image and the strap may not adequately reflect a user's fashion preferences.

The above information is presented as background information only to assist with an understanding of the disclosure. No determination has been made, and no assertion is made, as to whether any of the above might be applicable as prior art with regard to the disclosure.

SUMMARY

Embodiments of the disclosure may provide a method for determining a watch face image and an electronic device therefor.

Embodiments of the disclosure may provide a method for determining a watch face image that reflects a user's context and/or fashion preferences, and an electronic device therefor.

Embodiments of the disclosure may provide a method for recommending a strap that reflects a user's context and/or fashion preferences, and an electronic device therefor.

According to various example embodiments a method of operating an electronic device may include: acquiring an image using a camera of the electronic device; displaying a watch face preview matching the acquired image on a display of the electronic device; determining a watch face image from the watch face preview; and controlling a transceiver of the electronic device to transmit the watch face image to a smart watch; and applying the watch face image to the smart watch.

An electronic device according to various example embodiments may include a processor, a camera, a memory, a display, and a transceiver. The processor may be configured to control the electronic device to: acquire an image using the camera; display a watch face preview matching the acquired image on the display; determine a watch face image from the watch face preview; and control the transceiver to transmit the watch face image to a smart watch; and apply the watch face image to the smart watch.

According to various example embodiments, an electronic device can capture an image and apply a watch face image matching the captured image to a smart watch, so as to allow a user's context and/or fashion preference to be reflected via the watch face image.

According to various example embodiments, the electronic device can capture an image, and display and provide information relating to a strap matching the captured image, to recommend a strap matching a user's context and/or fashion preference.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Hereinafter, various example embodiments will be described in greater detail with reference to accompanying drawings.

Figure 1:
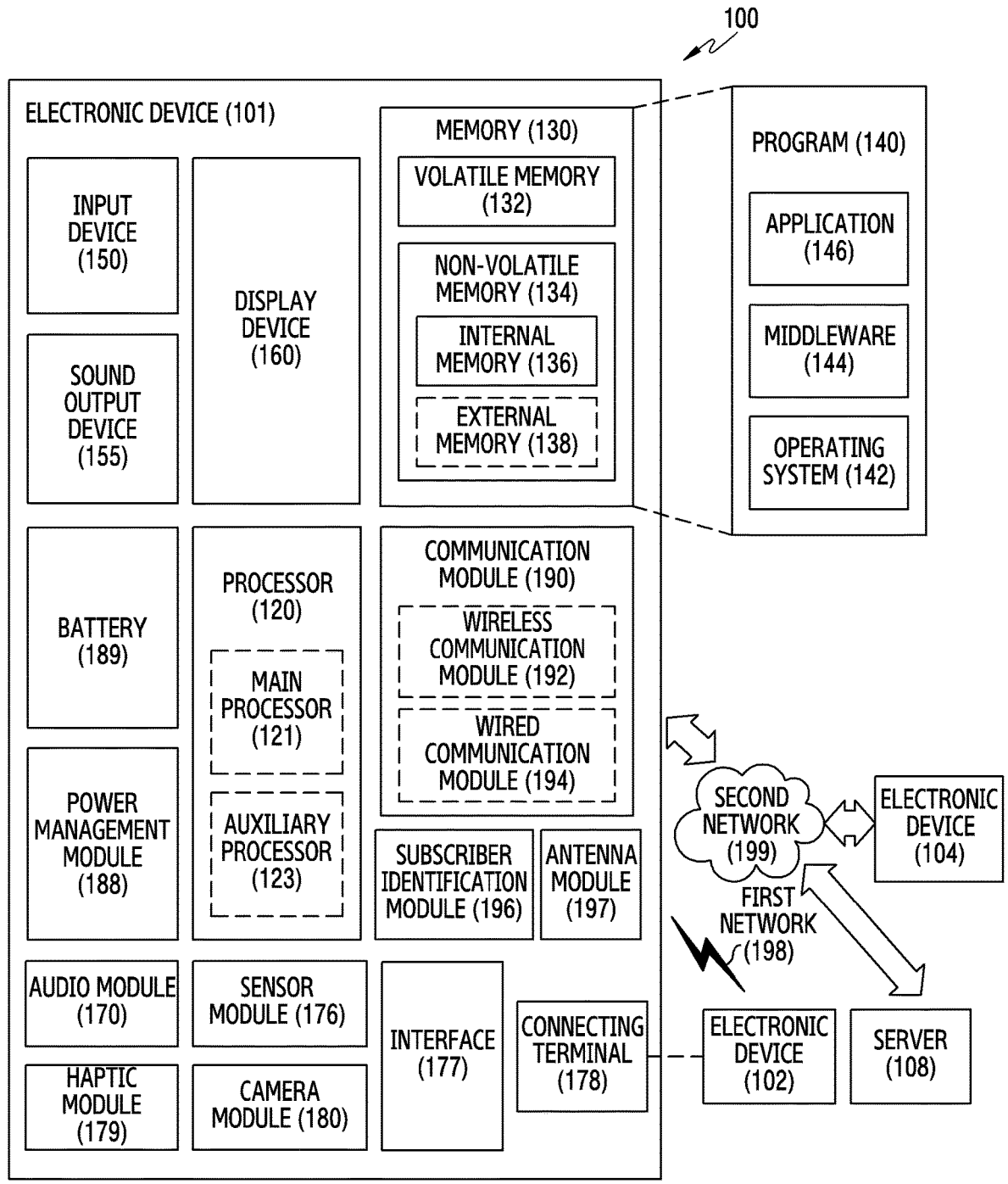
FIG. 1 is a block diagram illustrating an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

In various embodiments, an electronic device 102 may include a smart watch.

An electronic device (e.g., the electronic device 101 of FIG. 1) according to various example embodiments may include a processor (e.g., the processor 120 of FIG. 1), a camera (e.g., the camera module 180 of FIG. 1), a display (e.g., the display device 160 of FIG. 1), and a transceiver (e.g., the communication module 190 of FIG. 1). The processor may be configured to control the electronic device to: acquire an image using the camera; display a watch face preview matching the acquired image on the display; determine a watch face image from the watch face preview; and control the transceiver to transmit the watch face image to the smart watch.

In various example embodiments, the processor (e.g., the processor 120) may be configured to control the electronic device to: identify a color distribution of the image; identify representative colors in the image based on the color distribution; and apply at least one of the representative colors to a shape for the watch face image, to generate the watch face preview.

In various example embodiments, the processor (e.g., the processor 120) may be configured to control the electronic device to: based on resolution of the image, visibility of the image, complexity of the image, the shape of the image, the number of the representative colors, or the watch face image including watch hands, identify the shape for the watch face image; and apply, to the shape for the watch face image, at least one of material, brightness, saturation, lightness, or tone of each object included in the image.

In various example embodiments, the processor (e.g., the processor 120) may be configured to control the electronic device to identify the shape of the watch face image, which corresponds to the number of the representative colors.

In various example embodiments, the processor (e.g., the processor 120) may be configured to control the electronic device to identify the shape for the watch face image, in which at least one object, the size of which is equal to or smaller than a threshold size, is deleted from the shape of the image, based on the visibility of the image and the complexity of the image.

In various example embodiments, the processor (e.g., the processor 120) may be configured to control the electronic device to: determine whether at least one watch face preview matching the image is identified in a memory (e.g., the memory 130); and based on determining that the at least one watch face preview is identified in the memory, display the watch face preview from the identified at least one watch face preview on the display (e.g., the display device 160).

In various example embodiments, the processor (e.g., the processor 120) may be configured to control the electronic device to determine whether at least one strap image matching the image is identified in the memory (e.g., the memory 130); and based on determining that the at least one strap image is identified in the memory, display the identified at least one strap image on the display (e.g., the display device 160).

In various example embodiments, a strap related to the smart watch may include a flexible display, and the processor (e.g., the processor 120) may be configured to control the electronic device to: display a strap preview matching the image on the display (e.g., the display device 160); determine a strap image from the strap preview; control the transceiver (e.g., the communication module 190) to transmit the strap image to at least one or the smart watch or the strap; and apply the strap image to the strap.

In various example embodiments, the processor (e.g., the processor 120) may be configured to control the electronic device to: determine whether at least one strap image matching the image is identified in the memory (e.g., the memory 130); based on determining that the at least one strap image is not identified in the memory, identify the at least one strap image in a server related to the smart watch; and display a page including the identified at least one strap image on the display (e.g., the display device 160).

In various example embodiments, the memory (e.g., the memory 130) may store a list of straps and the at least one strap image corresponding to each of the straps, and the straps included in the list may be added to the list based on at least one of information indicating that the straps are purchased via a web site or an application related to the smart watch, information indicating that the straps are mounted on a main body of the smart watch, or an input for adding the straps to the list.

In various example embodiments, the processor (e.g., the processor 120) may be configured to control the electronic device to: control the transceiver (e.g., the communication module 190) to receive a request message for requesting the watch face image from the smart watch; execute a camera application in response to reception of the request message; and acquire the image via the camera (e.g., the camera module 180) based on an input for the camera application.

In various example embodiments, the processor (e.g., the processor 120) may be configured to: control the transceiver (e.g., the communication module 190) to receive information relating to image elements related to smart clothes from an electrical chip mounted on the smart clothes; and identify the watch face preview based on at least one of the image elements.

A "smart watch" may refer, for example, to a type of a wearable device, which may refer to a watch capable of performing various functions (e.g., a wireless communication function and/or application execution) that are improved over a typical watch. For example, the smart watch may refer to a wearable computing device capable of performing not only functions of a general watch but also various other functions. The smart watch may include a body and a strap. The strap may refer, for example, to an element of the smart watch that tightens and/or mounts the smart watch on a user's wrist. The body may refer, for example, to an element of the smart watch other than the strap, and may refer to an element of the smart watch, which is capable of executing a wireless communication function and/or an application. In various embodiments, a smart watch and a watch may be used interchangeably.

A "watch face" may refer, for example, to an element and/or an area in which time information and/or a content may be displayed in a smart watch.

A "watch face image" may refer, for example, to a watch screen displaying a background screen and/or time information displayed via the watch face.

A "watch face preview" may refer, for example, to a candidate image for the watch face image. For example, the watch face preview may refer to a candidate image recommended to be used as the watch face image.

A "watch hand" may refer, for example, to an hour hand, a minute hand, and/or a second hand on the watch screen.

A "strap image" may refer, for example, to an image representing a visual shape and/or color of the strap.

A "strap preview" may refer, for example, to a candidate image for the strap face image. For example, the strap preview may refer to a candidate image recommended to be used as the strap image.

"Smart clothes" may refer, for example, to clothes equipped with an electrical chip configured to store information, execute an application, and/or perform communication. A "smart watch" may refer, for example, to a type of a wearable device, and may refer to clothes capable of performing various functions (e.g., a wireless communication function and/or application execution) that are improved over typical clothes. For example, the smart clothes may include, for example, and without limitation, at least one of shoes, pants, shirts, jackets, glasses, hats, or the like, which are equipped with electrical chips.

Figure 2:
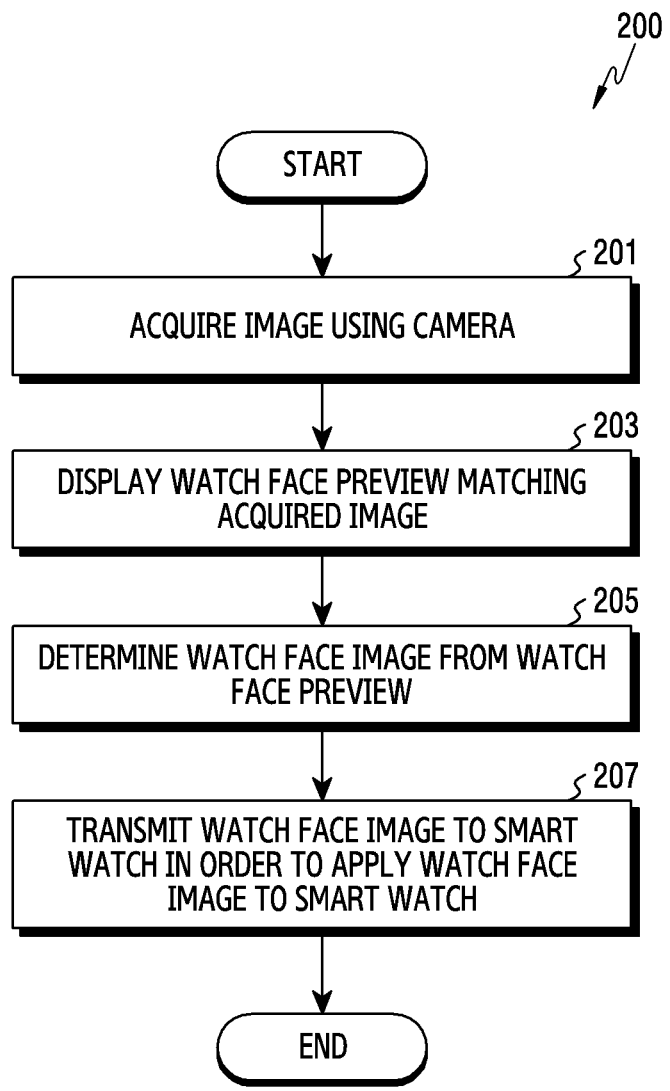
FIG. 2 is a flowchart illustrating an example operation of an electronic device according to various embodiments.

FIG. 2 is a flowchart illustrating an example operation of an electronic device according to various embodiments. Operations illustrated in a flowchart 200 of FIG. 2 may be performed by the electronic device 101 of FIG. 1 and/or the processor 120 of the electronic device 101.

Referring to FIG. 2, in operation 201, the processor 120 may acquire an image using a camera (e.g., the camera module 180). For example, the processor 120 may execute a camera application for acquisition of an image which may be a basis of a watch face image, and may acquire an image via the camera based on an input to the camera application.

In operation 203, the processor 120 may display a watch face preview matching the acquired image. For example, the processor 120 may identify the watch face preview matching the acquired image. For example, the processor 120 may analyze the acquired image, and may generate the watch face preview according to a result of the image analysis. As another example, the processor 120 may identify the watch face preview matching the image according to the result of the image analysis in a memory (e.g., the memory 130) of the electronic device 101. As another example, the processor 120 may identify the watch face preview matching the image according to the result of the image analysis in a server (e.g., the server 108) and/or a memory of the smart watch (e.g., the electronic device 102).

In operation 205, the processor 120 may determine a watch face image from the watch face preview. For example, the processor 120 may determine the watch face image by correcting the watch face preview. The processor 120 may correct resolution, material, brightness, saturation, tone, and/or lightness of the watch face preview or may modify a shape and/or pattern of the watch face preview, according to a user input. As another example, the processor 120 may determine the watch face image without correcting the watch face preview. In this case, the watch face preview and the watch face image may be identical.

In operation 207, the processor 120 may control a communication module (e.g., the communication module 190) to transmit the watch face image to the smart watch (e.g., the electronic device 102) in order to apply the watch face image to the smart watch. The processor 120 may transmit the watch face image to the smart watch so that the smart watch displays the watch face image via a watch face. For example, the processor 120 may transmit the watch face image to the smart watch via a first network 198 including a short range communication network, such as Bluetooth, Wi-Fi direct, and/or IrDA, or may transmit the watch face image to the smart watch via a second network 199 including a telecommunication network, such as a cellular network, the Internet, and/or a computer network.

In various embodiments, the processor 120 may analyze the image acquired using the camera to identify at least one image element for the image. For example, at least one image element may include at least one of resolution, visibility, complexity, color distribution, shape, material, representative color, number of representative colors, brightness, saturation, tone, or lightness related to the image. The processor 120 may identify individual elements for the image.

In various embodiments, the processor 120 may identify a resolution associated with the image. For example, the resolution of the image may be one of specified values (e.g., 320*320, 360*360, 360*480, and 216*432), and the processor 120 may identify a resolution corresponding to the specified value for image capturing.

In various embodiments, the processor 120 may identify a resolution associated with the image. The visibility may be related to the size of multiple objects included in the image. For example, the processor 120 may determine that the visibility is higher (or the visibility is good) as the average size of the multiple objects included in the image is large. As another example, when the average size of the multiple objects included in the image is small, the processor 120 may determine that the visibility is low (or the visibility is bad).

In various embodiments, the processor 120 may identify a complexity associated with the image. The complexity may be related to the number of objects included in the image. For example, as the greater number of multiple objects are included in the image, the processor 120 may determine that the complexity is high. As another example, as the smaller number of multiple objects are included in the image, the processor 120 may determine that the complexity is low.

In various embodiments, the processor 120 may identify a material associated with the image. For example, the processor 120 may identify whether the material of each object included in the image is leather, metal, and/or silicon.

In various embodiments, the processor 120 may identify color distribution, brightness, saturation, tone, and/or lightness associated with the image. For example, the processor 120 may identify color distribution, brightness, saturation, tone and/or lightness associated with the image by using histogram analysis. Furthermore, the processor 120 may identify representative colors in the image and may identify the number of the representative colors, based on the color distribution.

In various embodiments, the processor 120 may identify a shape associated with the image. For example, the processor 120 may identify contours of objects included in the image, and/or regions mapped to representative colors in the image.

In various embodiments, the processor 120 may identify a watch face preview or generate a watch face preview based on at least one image element. The processor 120 may identify a watch face preview or generate a watch face preview based on an external image element as well as at least one image element. For example, the external image element may include whether the image includes watch hands (the presence or absence of watch hands). If the watch face image includes watch hands, the smart watch may be referred to as an analog watch. As another example, if the watch face image does not include watch hands and displays time in digital numbers, the smart watch may be referred to as a digital watch.

In various embodiments, the processor 120 may control an input device (e.g., the input device 150) to receive a user input indicating to apply the determined watch face image to the smart watch, and to transmit, to the smart watch, the watch face image together with an indication signal that indicates to apply the watch face image to the smart watch, in response to reception of the user input. Alternatively, the indication signal that indicates to apply the watch face image to the smart watch may include the watch face image.

In FIG. 2, the processor 120 may determine a watch face image from a watch face preview, but this is merely an illustrative example and various modifications are possible. For example, the processor 120 may transmit, to the smart watch, a watch face preview matching an image acquired using the camera, and the smart watch may determine a watch face image from a watch face preview (e.g., determining a watch face image by modifying a watch face preview, or determining a watch face preview to be a watch face image without modification).

Figure 3A:
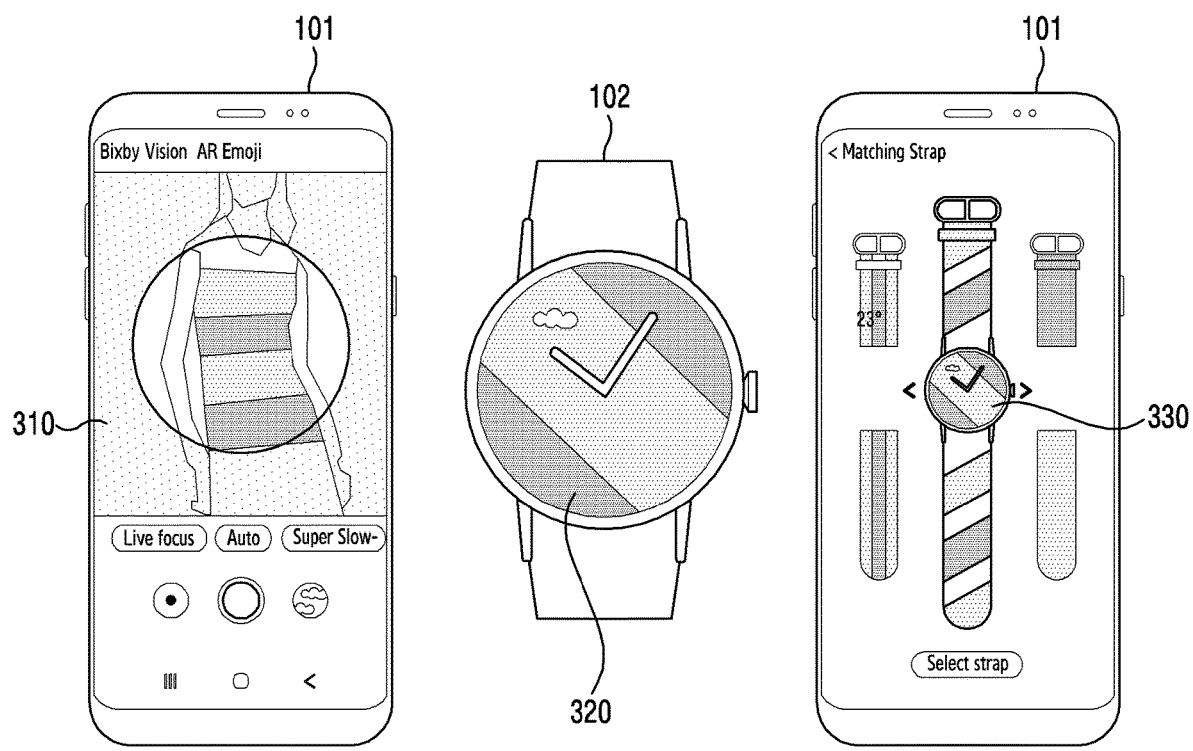
FIG. 3A is a diagram illustrating an example of determining and displaying a watch face image according to various embodiments.
Figure 3B:
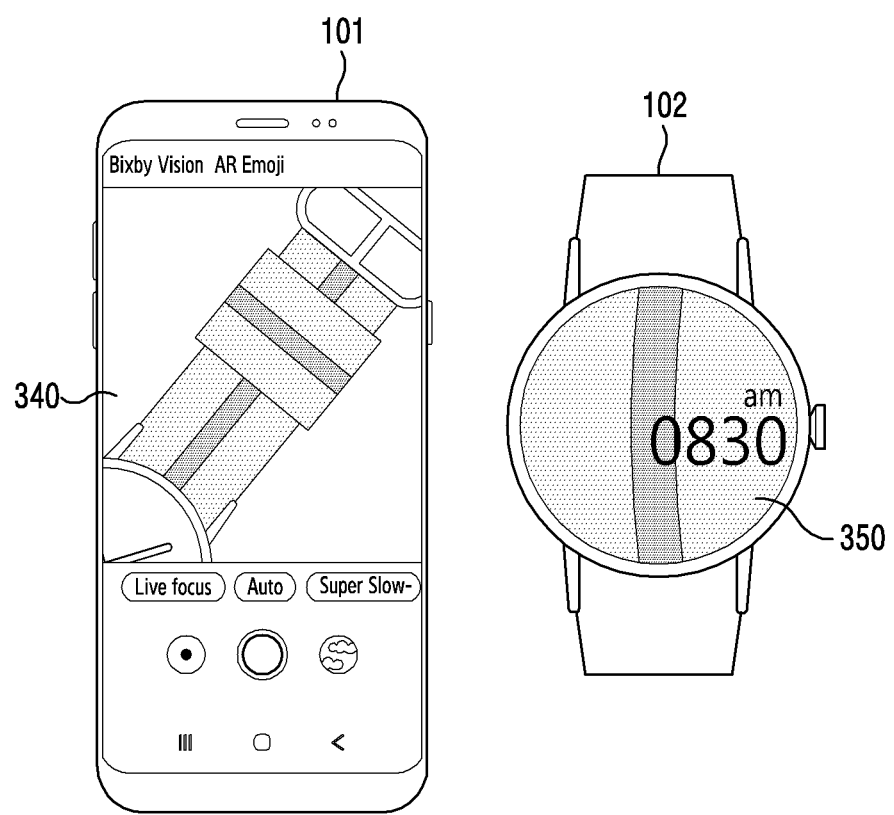
FIG. 3B is a diagram illustrating an example of determining and displaying a watch face image according to various embodiments.
Figure 3C:
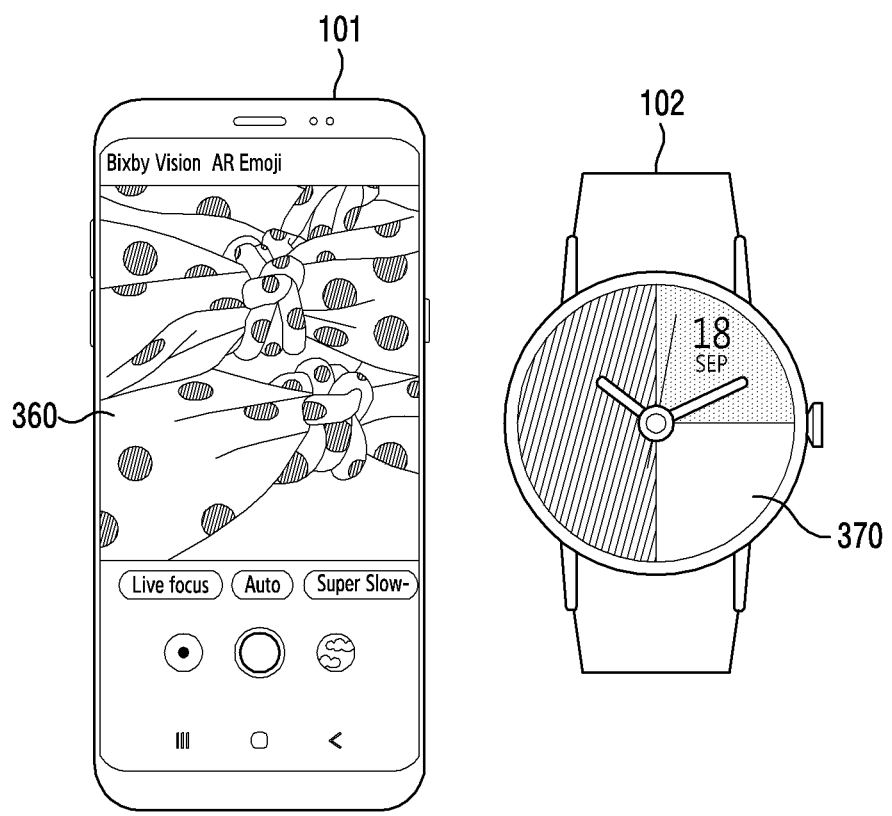
FIG. 3C is a diagram illustrating an example of determining and displaying a watch face image according to various embodiments.

FIG. 3A is a diagram illustrating an example of determining and displaying a watch face image according to various embodiments, FIG. 3B is a diagram illustrating an example of determining and displaying a watch face image according to various embodiments, and FIG. 3C is a diagram illustrating an example of determining and displaying a watch face image according to various embodiments.

Referring to FIG. 3A, the electronic device 101 may acquire an image 310 (e.g., an image including a user's clothes) using a camera (e.g., the camera module 180), and may display a watch face preview 330 matching (or corresponding to) the image 310. In various embodiments, a plurality of watch face previews matching the image 310 may exist, wherein the electronic device 101 may display the plurality of watch face previews including the watch face preview 330. Further, the electronic device 101 may display a plurality of strap images matching the image 310, and may display a combination of the strap images and the watch face previews. The electronic device 101 may determine a watch face image 320 from the watch face preview 330, and may transmit the determined watch face image 320 to a smart watch (e.g., the electronic device 102) in order to apply the watch face image 320 to the smart watch (or to allow the smart watch to display the watch face image 320). In various embodiments, the watch face image 320 and the watch face preview 330 may be identical (e.g., in a case of determining the watch face preview 330 to be the watch face image 320 without modification) or may be different (e.g., in a case of determining the watch face image 320 by modifying the watch face preview 330).

Referring to FIG. 3B, the electronic device 101 may acquire an image 340 (e.g., an image including a strap of a smart watch) using a camera, and may determine a watch face image 350 from a watch face preview matching the image 340. For example, the electronic device 101 may determine the watch face image 350 by modifying a resolution of the watch face preview and/or rotating the watch face preview. The electronic device 101 may transmit the determined watch face image 350 to the smart watch to apply the watch face image 350 to the smart watch.

Referring to FIG. 3C, the electronic device 101 may acquire an image 360 (e.g., an image including an object) using a camera, and may determine a watch face image 370 from a watch face preview matching the image 360. In various embodiments, the electronic device 101 may identify representative colors associated with the image 360, and may generate a watch face preview by applying at least one of the representative colors to a shape for the watch face image. For example, the shape for the watch face image may correspond to the number of representative colors and/or may include a patterned shape if the electronic device 101 has patterned the shape of the image 360, and/or may include a patterned shape if the electronic device 101 has patterned the shape of the image 360. The electronic device 101 may determine a watch face image 370 from a watch face preview, and may transmit the watch face image 370 to a smart watch (e.g., the electronic device 102) in order to apply the watch face image 370 to the smart watch.

Figure 4:
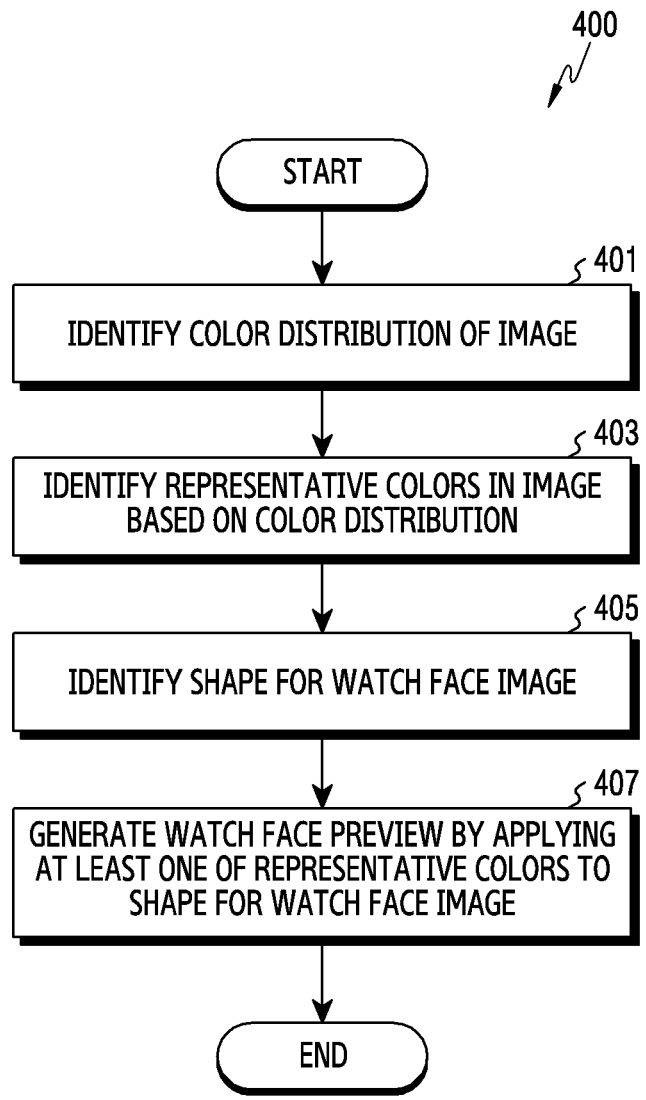
FIG. 4 is a flowchart illustrating an example operation for generating a watch face preview according to various embodiments.

FIG. 4 is a flowchart illustrating an example operation for generating a watch face preview according to various embodiments. Operations illustrated in a flowchart 400 of FIG. 4 may be performed by the electronic device 101 of FIG. 1 and/or the processor 120 of the electronic device 101.

Referring to FIG. 4, in operation 401, the processor 120 may identify a color distribution of an image acquired using a camera (e.g., the camera module 180). The processor 120 may capture an image using the camera and may identify the color distribution of the image acquired via image capturing. For example, the processor 120 may determine the color distribution of the image by using histogram analysis. For example, the processor 120 may determine a color value in each pixel of the image, and may determine a distribution of color values corresponding to pixels constituting the full image.

In operation 403, the processor 120 may identify representative colors in the image based on the color distribution. In various embodiments, the representative color may be a color representing similar colors in the color distribution. For example, the processor 120 may identify color values within a threshold range in the color distribution, and may determine, as the representative color, a color of an average value, a representative value (or a value of a largest number), or an intermediate value of the identified color values.

In operation 405, the processor 120 may identify a shape for a watch face image. For example, the processor 120 may retrieve the shape for the watch face image based on at least one image element and/or external image element, in a plurality of shapes for the watch face image, which are stored in a memory (e.g., the memory 130) of the electronic device 101. As another example, the processor 120 may retrieve the shape of the watch face image based on at least one image element and/or external image element, in the plurality of shapes for the watch face image, which are stored in the memory of a smart watch (e.g., the electronic device 102) and/or a server related to the smart watch, by communicating with the smart watch and/or the server. If the plurality of shapes for the watch face image include patterned shapes, each of the shapes for the watch face image may have a different pattern shape. As another example, the processor 120 may generate the shape for the watch face image. The processor 120 may generate shapes for the watch face image based on at least one image element and/or external image element. The processor 120 may pattern or simplify the shape of the image acquired using the camera, to generate the shape for the watch face image. The processor 120 may determine a shape of the image to be the shape for the watch face image without notification.

In operation 407, the processor 120 may generate a watch face preview by applying at least one of representative colors to the shape for the watch face image. For example, the processor 120 may generate the watch face preview by applying all representative colors to the shape for the watch face image, applying a part of the representative colors to the shape for the watch face image, or applying a part of the representative colors and a color other than the representative colors to the shape for the watch face image. The generated watch face preview may include the shape for the watch face image, to which at least one of the representative colors has been applied.

In various embodiments, in operation 401, the processor 120 may identify other image elements and/or an external image element, as well as the color distribution of the image. For example, the electronic device 120 may identify at least one of resolution, visibility, complexity, shape, material, representative colors, number of representative colors, brightness, saturation, tone, or lightness associated with the image and/or the presence or absence of watch hands.

In various embodiments, the processor 120 may identify the shape for the watch face image based on at least one of resolution, visibility, complexity, shape, number of representative colors, or the presence or absence of watch hands of the image (or captured image) acquired using the camera.

For example, the processor 120 may determine shapes for the watch face image of a small size if the resolution of the captured image is high, and may determine shapes for the watch face image of a large size if the resolution of the image is low. As another example, if a horizontal length and a vertical length representing the resolution are the same, the processor 120 may determine the shapes for the watch face image to be a circle or a figure having the same length of all sides, such as a square, and if the horizontal length and the vertical length representing the resolution are different, the processor 120 may determine the shapes for the watch face image to be a figure having different lengths of at least two sides, such as a rectangle.

For example, the processor 120 may determine shapes for the watch face image having a high visibility if the visibility of the captured image is high, and may determine shapes for the watch face image having a low visibility if the visibility of the image is low.

For example, the processor 120 may determine shapes for the watch face image having a high complexity if the complexity of the captured image is high, and may determine shapes for the watch face image having a low complexity if the complexity of the image is low.

For example, the processor 120 may pattern the shape of the captured image, and may determine the patterned shape as the shape for the watch face image. As another example, the processor 120 may simplify the shape of the captured image, and may determine the simplified shape as the shape for the watch face image. In various embodiments, simplification may refer, for example, to processing of increasing visibility of an image and reducing complexity of the image. For example, the processor 120 may simplify the shape of the captured image based on the visibility and/or complexity of the captured image. For example, if the visibility of the captured image is equal to or lower than a threshold value, and/or the complexity of the captured image is equal to or higher than a threshold value, the processor 120 may delete at least one object, the size of which is equal to or smaller than a threshold size, from the shape of the image, so as to simplify the shape of the captured image. According to simplification, the shape for the watch face image may include the shape in which at least one object, the size of which is equal to or smaller than the threshold size, is deleted from the shape of the image.

For example, the processor 120 may determine shapes for the watch face image, which correspond to the number of representative colors. For example, if the number of representative colors associated with the captured image is N, the processor 120 may determine shapes for the watch face image, which may include N representative colors.

For example, if the watch face image is configured to include watch hands (or if the watch is an analog style), the processor 120 may determine shapes for the watch face image, which include watch hands. As another example, if the watch face image is configured not to include watch hands (or if the watch is a digital style), the processor 120 may determine shapes for the watch face image, which does not include watch hands.

In various embodiments, the processor 120 may identify shapes for the watch face image based on a combination of the described elements (e.g., the image elements and/or external image element).

In various embodiments, in addition to or in place of at least one of the representative colors, the processor 120 may apply at least one of material, brightness, saturation, lightness, or tone of each object included in the image to the shape for the watch face image. For example, if the material of the object included in the image is metal, leather, or silicon, the processor 120 may express the shape for the watch face image to include an object having metallicity, leather texture, or silicon texture.

In various embodiments, the shape for the watch face image and/or the watch face preview may include an image that changes over time. For example, shapes for the watch face image and/or multiple watch face previews may vary from one to the other at a predetermined time and/or at a predetermined interval.

Figure 5A:
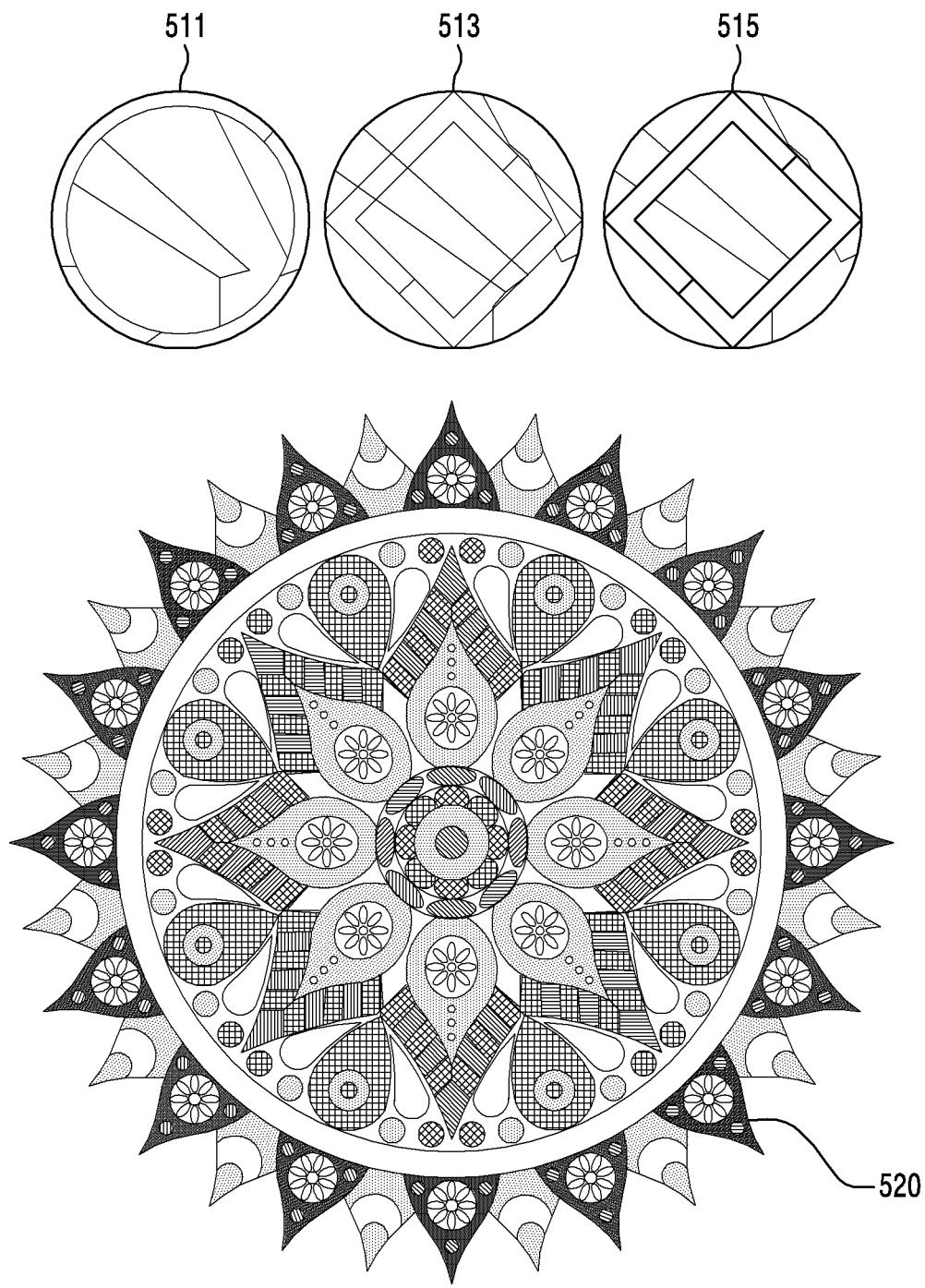
FIG. 5A is a diagram illustrating an example of generating a watch face preview according to various embodiments.
Figure 5B:
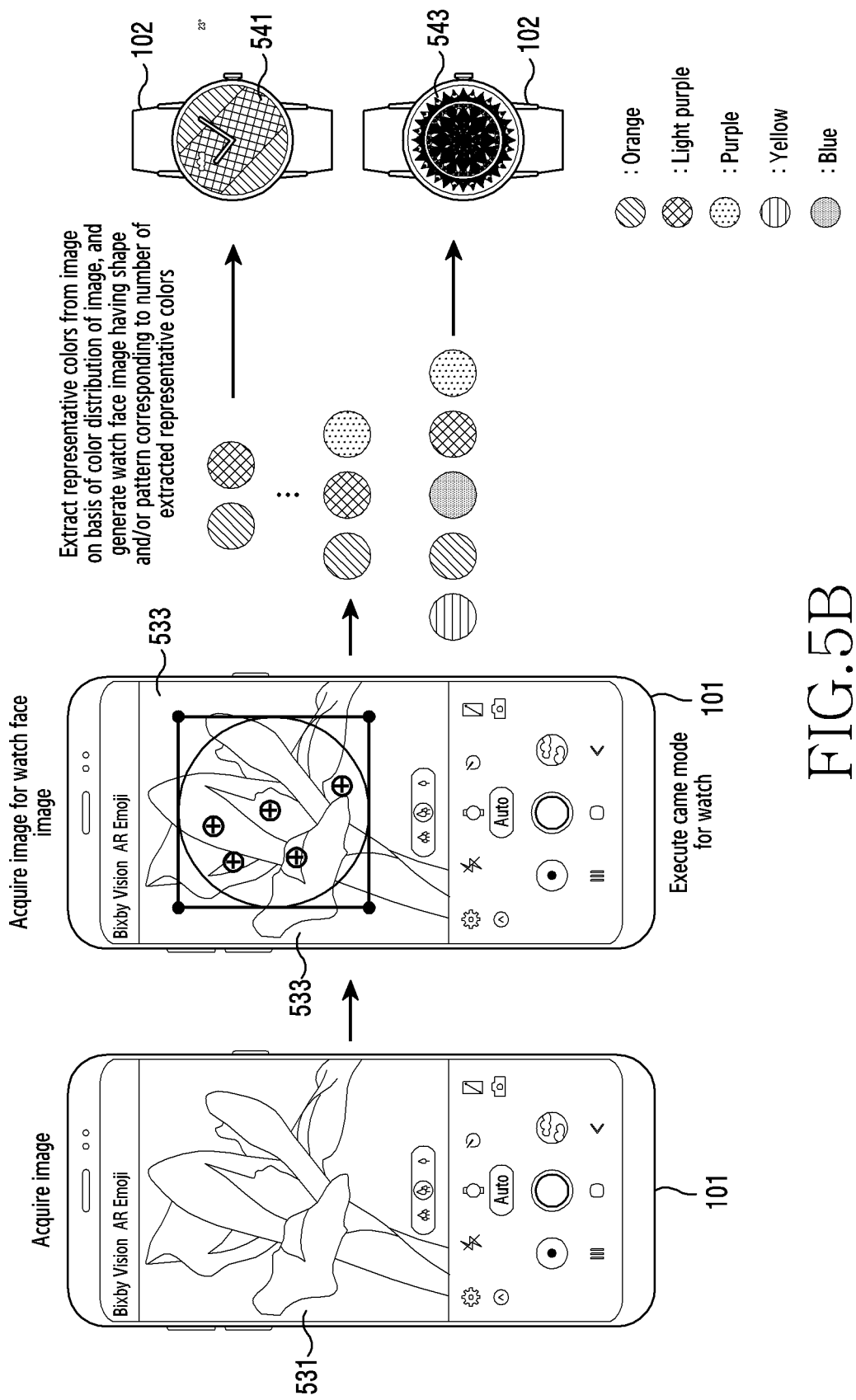
FIG. 5B is a diagram illustrating an example of generating a watch face preview according to various embodiments.
Figure 5C:
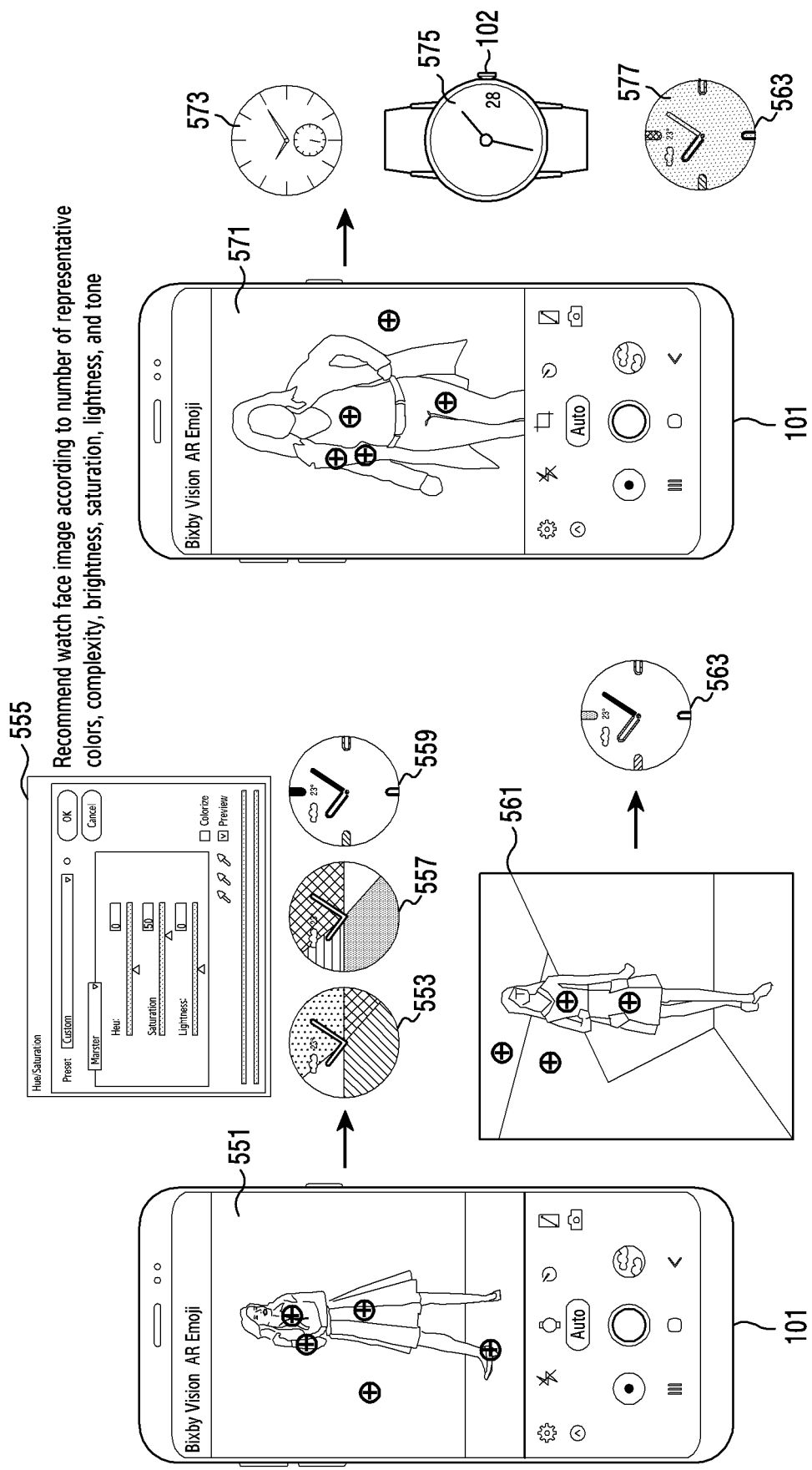
FIG. 5C is a diagram illustrating an example of generating a watch face preview according to various embodiments.

FIG. 5A is a diagram illustrating an example of generating a watch face preview according to various embodiments, FIG. 5B is a diagram illustrating an example of generating a watch face preview according to various embodiments, and FIG. 5C is a diagram illustrating an example of generating a watch face preview according to various embodiments.

Referring to FIG. 5A, the electronic device 101 may identify shapes 511, 513, 515, and 520 for a watch face image. According to an embodiment, the electronic device 101 may identify the shapes 511, 513, and 515 for the watch face image based on at least one image element and/or external image element. In various embodiments, the shapes 511, 513, and 515 for the watch face image may include a patterned shape, and each of the shapes 511, 513, and 515 may have a different pattern shape. According to an embodiment, the electronic device 101 may identify the shape 520 for the watch face image based on at least one image element and/or external image element. For example, the electronic device 101 may identify representative colors from a captured image, and may identify the shape 520 corresponding to the number of the representative colors. As illustrated in FIG. 5A, the shape 520 may be related, for example, to a mandala pattern. According to an embodiment, the shape 520 having a mandala pattern may vary over time. The electronic device 101 may generate a watch face preview by applying at least one image element (e.g., representative colors, material, lightness, saturation, and/or tone of the captured image) to the shapes 511, 513, 515, and 520.

Referring to FIG. 5B, the electronic device 101 may acquire an image 531 via a camera application operating in a normal camera mode. If an input to switch from the normal camera mode to a camera mode for watch is received, the camera application may operate in the camera mode for watch. In other words, a camera mode for acquiring a watch face image may be configured separately from the normal camera mode. In an embodiment, a resolution in the camera mode for watch may be configured to a resolution suitable for displaying the watch face image. In the camera mode for watch, the electronic device 101 may acquire an image 533 which may be a basis of the watch face image. The electronic device 101 may identify representative colors from the captured image based on color distribution of the acquired image (or the captured image), and may generate a watch face image having shapes and/or patterns corresponding to the number of the identified representative colors. For example, if the number N of representative colors associated with the captured image is 2 (N=2), the electronic device 101 may identify a shape 541 which may include N (N=2) representative colors, and may generate the watch face image by applying orange and light purple colors to the shape 541. As another example, if the number N of representative colors associated with the captured image is 5 (N=5), the electronic device 101 may identify a shape 543 which may include N (N=5) representative colors, and may generate the watch face image by applying orange, light purple, purple, yellow, and blue colors to the shape 543. Although not illustrated, if the number N of representative colors associated with the captured image is 3 (N=3), the electronic device 101 may generate the watch face image having shapes and/or patterns corresponding to N (N=3). The electronic device 101 may transmit the generated watch face image to a smart watch (e.g., the electronic device 102), and the smart watch may display a watch face image including the watch face image (e.g., the shape 541) and/or a watch face image including the shape 543.

Referring to FIG. 5C, the electronic device 101 may execute a camera application, and may acquire an image 551 which may be a basis of a watch face image using a camera (e.g., the camera module 180) based on an input to the camera application. The electronic device 101 may identify representative colors (e.g., pink, indigo, orange, and white colors) of the image 551, and may generate the watch face image by applying the representative colors to the shapes and/or patterns 553 corresponding to the number of the representative colors. As another example, the electronic device 101 may acquire an image 561 using the camera. The electronic device 101 may identify representative colors (e.g., yellow, white, and indigo colors) of the image 561, and may generate the watch face image by applying at least one of the representative colors and another color (e.g., a green color) to the shape and/or patterns 557 corresponding to the number of the representative colors. As another example, if the watch face image is configured to include watch hands, the electronic device 101 may identify a shape 559 including watch hands, and may generate the watch face image by applying, to the shape 559, at least one of the representative colors identified from the captured image 551 and other colors (e.g., turquoise, red, and gray colors). As another example, if the watch face image is configured to include watch hands, the electronic device 101 may identify a shape 563 including watch hands, and may generate the watch face image by applying, to the shape 563, at least one (e.g., a yellow color) of the representative colors identified from the captured image 561 and other colors (e.g., red, turquoise, gray, and blue colors).

In various embodiments, the electronic device 101 may change a property of at least one representative color among the representative colors identified from the captured image. For example, with respect to each representative color, the electronic device 101 may display a user interface 555 for changing hue, saturation, and/or lightness of the representative color, and the electronic device 101 may change the hue, saturation, and/or lightness of the representative color based on an input received via the user interface 555. The electronic device 101 may apply at least one representative color having a changed property to the shape for the watch face image.

In various embodiments, the electronic device 101 may recommend the watch face image according to complexity, brightness, saturation, lightness, and/or tone as well as the number of the representative colors. For example, the electronic device 101 may acquire an image 571 which may be a basis of the watch face image using the camera, and may determine the representative colors, brightness, and material (metallicity) of the acquired image (e.g., the captured image) 571 and indication that the watch face image includes watch hands. The electronic device 101 may identify a shape 573 including watch hands based on the described image element and/or external image element, and may generate the watch face image by applying a metallic material to the shape 573 as in the captured image 571. As another example, the electronic device 101 may identify a shape 575 including watch hands, and may generate the watch face image by applying at least one of representative colors of the captured image 571. As another example, the electronic device 101 may generate the watch face image by applying, as in the image 571, low brightness to the shape 577 including watch hands, to which yellow, red, turquoise, gray, and blue colors are applied. The electronic device 101 may transmit the generated watch face image to a smart watch (e.g., the electronic device 102) so as to allow the smart watch to display the watch face image.

Figure 6:
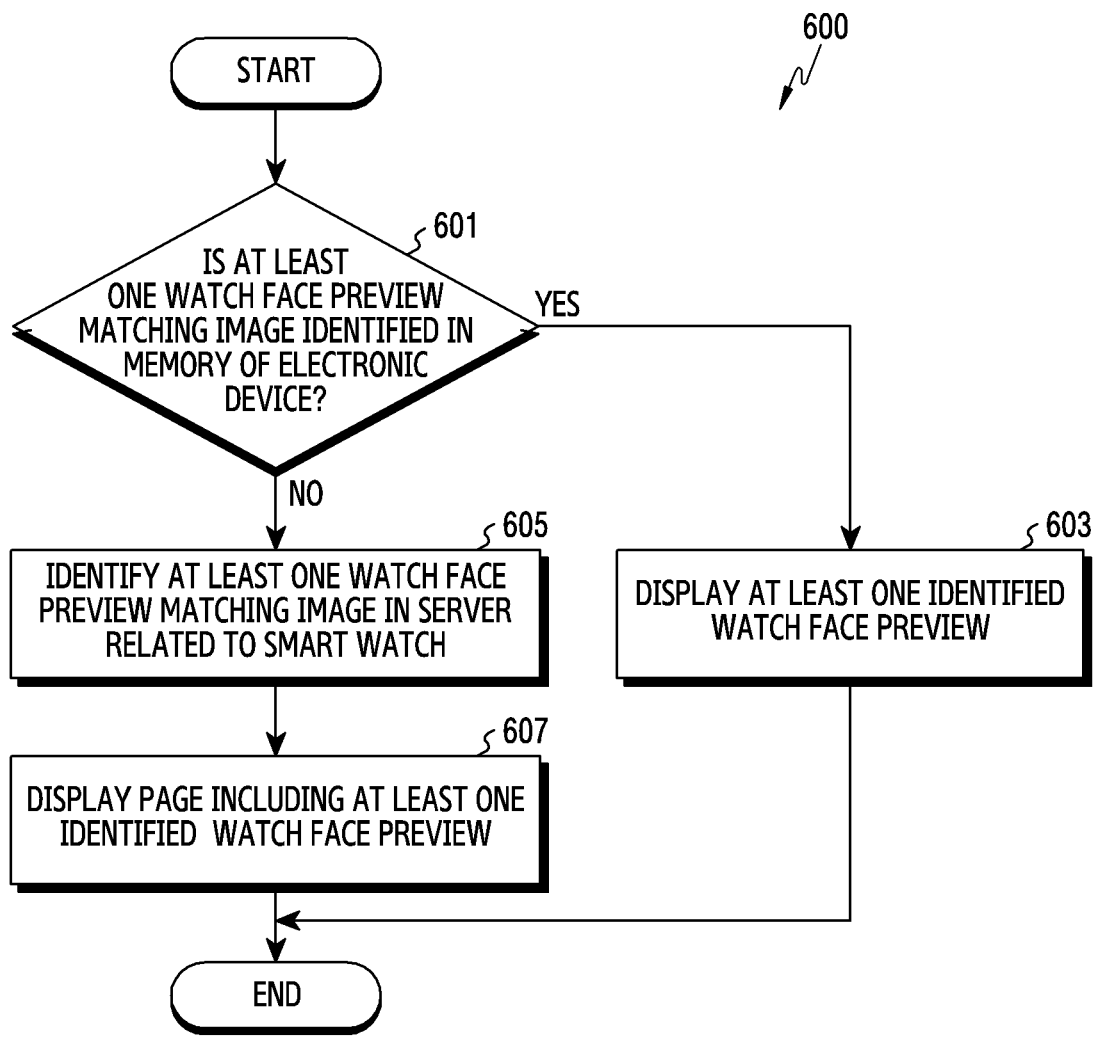
FIG. 6 is a flowchart illustrating an example operation for matching a watch face preview according to various embodiments.

FIG. 6 is a flowchart illustrating an example operation for determining a watch face preview according to various embodiments. Operations illustrated in a flowchart 600 of FIG. 6 may be performed by the electronic device 101 of FIG. 1 and/or the processor 120 of the electronic device 101.

Referring to FIG. 6, in operation 601, the processor 120 may determine whether at least one watch face preview matching a captured image is identified in a memory (e.g., the memory 130) of the electronic device 101. For example, the memory of the electronic device 101 may store a list of watch face previews, and the processor 120 may retrieve, the list of watch face previews, at least one watch face preview having at least one image element (e.g., resolution, visibility, complexity, color distribution, shape, material, representative colors, number of representative colors, brightness, saturation, tone, and/or lightness) matching that of the captured image. As a result of the retrieving, if at least one watch face preview is identified in the memory of the electronic device 101 (Yes in operation 601), the processor 120 may perform operation 603. On the other hand, if at least one watch face preview is not identified in the memory of the electronic device 101 (No in operation 601), the processor 120 may perform operations 605 and 607.

In operation 603, the processor 120 may display at least one identified watch face preview. For example, at least one of image elements of at least one identified watch face preview may match (or be identical to) at least one image element corresponding to image elements of the captured image. As another example, a combination of at least two of image elements of at least one identified watch face preview may match (or be identical to) a combination of image elements corresponding to image elements of the captured image.

In operation 605, the processor 120 may identify at least one watch face preview matching the captured image, in a server (e.g., the server 108) related to a smart watch. In various embodiments, the server related to the smart watch may include a server that provides an application related to the smart watch and/or a server that provides a website related to the smart watch. The processor 120 may control the communication module 190 to communicate with the server via a network (e.g., the network 199), and may retrieve, in the server, at least one watch face preview having at least one image element matching that of the captured image, to identify a watch face preview matching the captured image. For example, at least one of image elements of at least one identified watch face preview may match (or be identical to) at least one image element corresponding to image elements of the captured image. As another example, a combination of at least two of image elements of at least one identified watch face preview may match (or be identical to) a combination of image elements corresponding to image elements of the captured image. The processor 120 may control a display device to display the watch face preview matching the captured image, so as to induce and/or recommend a user to apply, to the smart watch, a watch face image determined from the displayed watch face preview.

In operation 607, the processor 120 may control the display device (e.g., the display device 160) to display a page including at least one identified watch face preview. If the watch face preview matching the captured image is not stored in the memory, the processor 120 may retrieve, in the server, the watch face preview matching the captured image to identify the watch face preview, and may display the retrieved watch face preview. Accordingly, the processor 120 may recommend downloading the watch face preview or may induce a purchase of the watch face preview.

In various embodiments, if at least one watch face preview matching the captured image is not identified in the memory of the electronic device 101, the processor 120 may display a message indicating that the watch face preview matching the captured image does not exist in the memory.

In addition to displaying of the message, the processor 120 may selectively perform operations 605 and 607 (alternatively, in addition to displaying of the message, the processor 120 may perform or may not perform operations 605 and 607).

In various embodiments, if at least one watch face preview matching the captured image is not identified in the memory of the electronic device 101, the processor 120 may control the communication module to transmit information relating to the captured image to the server. For example, the processor 120 may control the communication module to transmit the captured image to the server, or may transmit information relating to image elements of the captured image and/or information relating to the external image element to the server. The server may identify, in the memory, at least one watch face preview matching the captured image based on the information relating to the received captured image, and may transmit a page including the identified at least one watch face preview to the electronic device 101. In this case, the processor 120 may control the display device to display the received page (including the at least one watch face preview identified by the server), in operation 607.

In various embodiments, the processor 120 may display a page including a uniform resource locator (URL) of a website for downloading and/or purchasing the watch face preview displayed in operation 607. The processor 120 may access the website of the URL based on an input made via the input device of the electronic device 101, and may download, from the server, the watch face preview on the website.

In various embodiments, if at least one watch face preview matching the captured image is not identified in the server, the processor 120 may display a message indicating that the watch face preview matching the captured image does not exist in the memory. In this case, the processor 120 may not perform operations 605 and 607.

Figure 7:
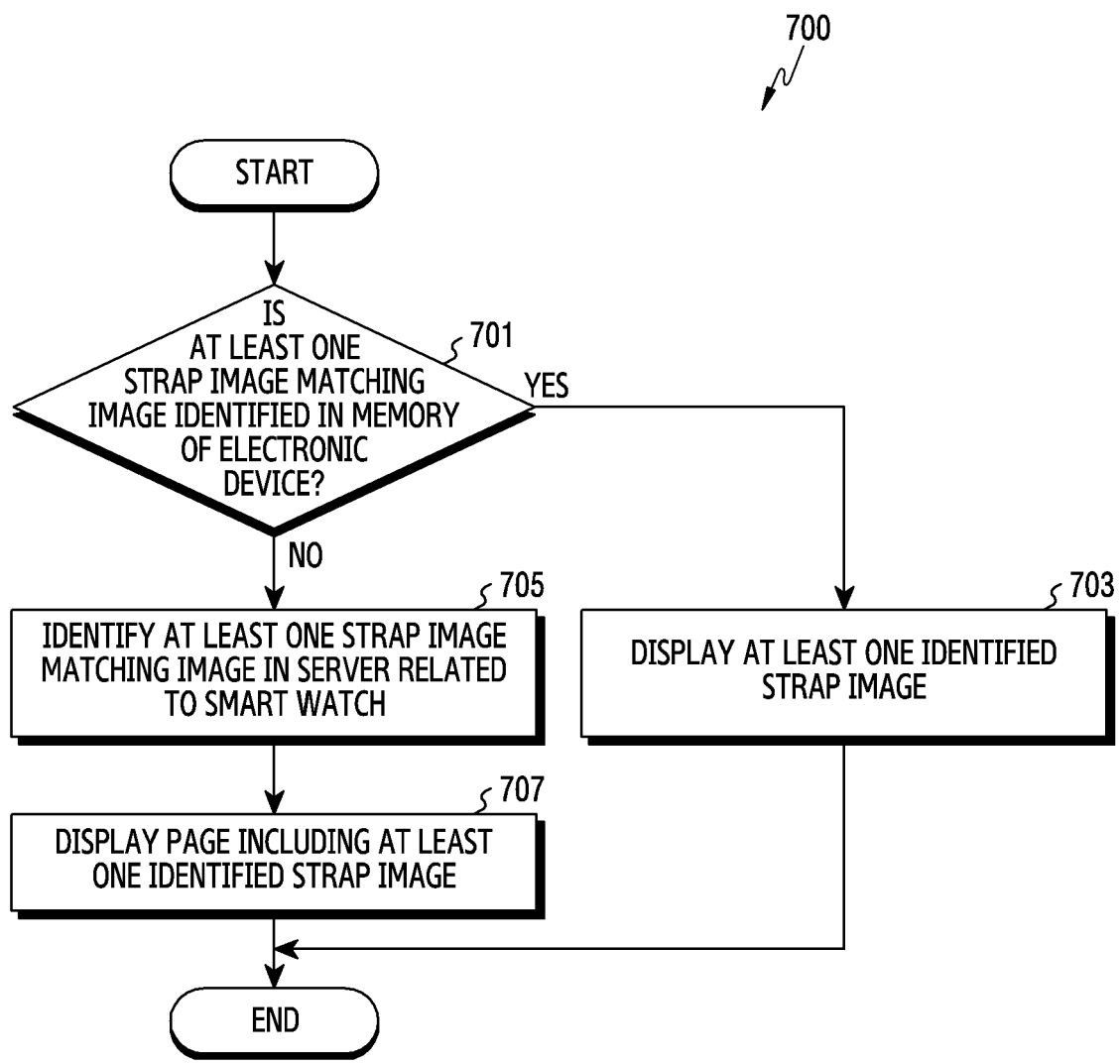
FIG. 7 is a flowchart illustrating an example operation for matching a strap of a smart watch according to various embodiments.

FIG. 7 is a flowchart illustrating an example operation for determining a strap of a smart watch according to various embodiments. Operations illustrated in a flowchart 700 of FIG. 7 may be performed by the electronic device 101 of FIG. 1 and/or the processor 120 of the electronic device 101.

Referring to FIG. 7, in operation 701, the processor 120 may determine whether at least one strap image (or at least one strap) matching a captured image is identified in a memory (e.g., the memory 130) of the electronic device 101. For example, the memory of the electronic device 101 may store a list of straps and a list of strap images corresponding thereto, and the processor 120 may retrieve, in the list of the strap images, at least one strap image having at least one image element (e.g., resolution, visibility, complexity, color distribution, shape, material, representative colors, number of representative colors, brightness, saturation, tone, and/or lightness) matching that of the captured image. As a result of the retrieving, if at least one strap image is identified in the memory of the electronic device 101 (Yes in operation 701), the processor 120 may perform operation 703. On the other hand, if at least one strap image is not identified in the memory of the electronic device 101 (No in operation 701), the processor 120 may perform operations 705 and 707.

In operation 703, the processor 120 may display at least one identified strap image. For example, at least one of image elements of at least one identified strap image may match (or be identical to) at least one image element corresponding to image elements of the captured image. As another example, a combination of at least two of image elements of at least one identified strap image may match (or be identical to) a combination of image elements corresponding to image elements of the captured image. The processor 120 may control a display device to display the strap image matching the captured image, so as to induce and/or recommend a user to use a strap having the displayed strap image.

In operation 705, the processor 120 may identify at least one strap image (or at least one strap) matching the captured image, in a server (e.g., the server 108) related to a smart watch. The processor 120 may control the communication module 190 to communicate with the server via a network (e.g., the network 199), and may retrieve, in the server, at least one strap image having at least one image element matching that of the captured image, to identify the strap image matching the captured image. For example, at least one of image elements of at least one identified strap image may match (or be identical to) at least one image element corresponding to image elements of the captured image. As another example, a combination of at least two of image elements of at least one identified strap image may match (or be identical to) a combination of image elements corresponding to image elements of the captured image.

In operation 707, the processor 120 may control the display device (e.g., the display device 160) to display a page including at least one identified strap image. If the strap image matching the captured image is not stored in the memory of the electronic device 101, the processor 120 may retrieve, in the server, the strap image matching the captured image to identify the strap image, and may display the retrieved strap image. Accordingly, the processor 120 may recommend a strap having the strap image, and may induce a purchase of the strap.

In various embodiments, if at least one strap image matching the captured image is not identified in the memory of the electronic device 101, the processor 120 may display a message indicating that the strap image matching the captured image does not exist in the memory. In addition to displaying of the message, the processor 120 may selectively perform operations 705 and 707 (alternatively, in addition to displaying of the message, the processor 120 may perform or may not perform operations 705 and 707).

In various embodiments, if at least one strap image matching the captured image is not identified in the memory of the electronic device 101, the processor 120 may control the communication module to transmit information relating to the captured image to the server. For example, the processor 120 may control the communication module to transmit the captured image to the server, or may transmit information relating to image elements of the captured image and/or information relating to the external image element to the server. The server may identify, in the memory of the server, at least one strap image matching the captured image based on the information relating to the received captured image, and may transmit a page including the identified at least one strap image to the electronic device 101. In this case, the processor 120 may control the display device to display the received page (including the at least one strap image identified by the server), in operation 707.

In various embodiments, the processor 120 may display a page including a uniform resource locator (URL) of a website for purchasing a strap having the strap image displayed in operation 707. The processor 120 may access the website of the URL based on an input made via the input device of the electronic device 101, and may induce a purchase of the strap on the website.

In various embodiments, if at least one strap image matching the captured image is not identified in the server, the processor 120 may display a message indicating that the strap image matching the captured image does not exist in the memory. In this case, the processor 120 may not perform operations 705 and 707.

In various embodiments, the processor 120 may identify a strap image matching a watch face image and/or a watch face preview, instead of identifying the strap image matching the captured image in operations 701 and 705. The watch face preview may match the captured image, and the watch face image may be determined from the watch face preview. For example, the processor 120 may identify a strap image, which has at least one image element matching that of the watch face preview, in the server and/or the memory of the electronic device 101.

In various embodiments, the processor 120 may recommend a bezel ring matching the captured image, as well as a strap matching the captured image. For example, the memory of the electronic device 101 may store a list of bezel rings, and the processor 120 may identify, in the list of bezel rings, a bezel ring matching the captured image and may display a bezel ring image of the identified bezel ring via the display device. As another example, the processor 120 may identify, in the server, the bezel ring matching the captured image, and may display the bezel ring image of the identified bezel ring via the display device so as to induce a purchase of the bezel ring.

In various embodiments, the memory of the electronic device 101 may store a list of straps and a list of strap images corresponding to the straps. A strap may be added to the list of straps based on at least one of information indicating that the strap is purchased via a website or an application related to a smart watch, information indicating the strap is mounted on the body of the smart watch, or an input for adding the strap to the list of straps.

Figure 8A:
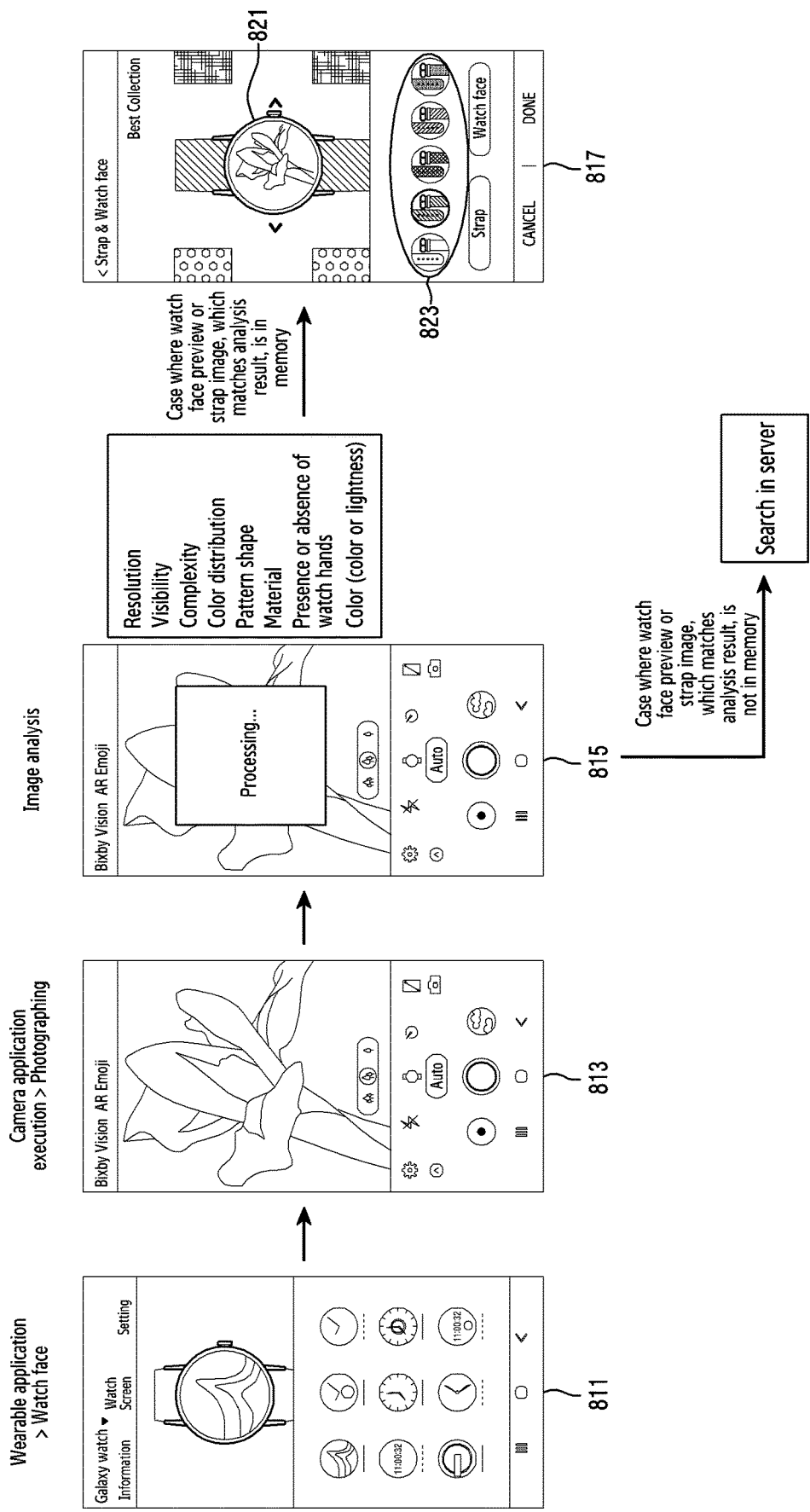
FIG. 8A is a diagram illustrating an example of determining a watch face preview and a strap according to various embodiments.
Figure 8B:
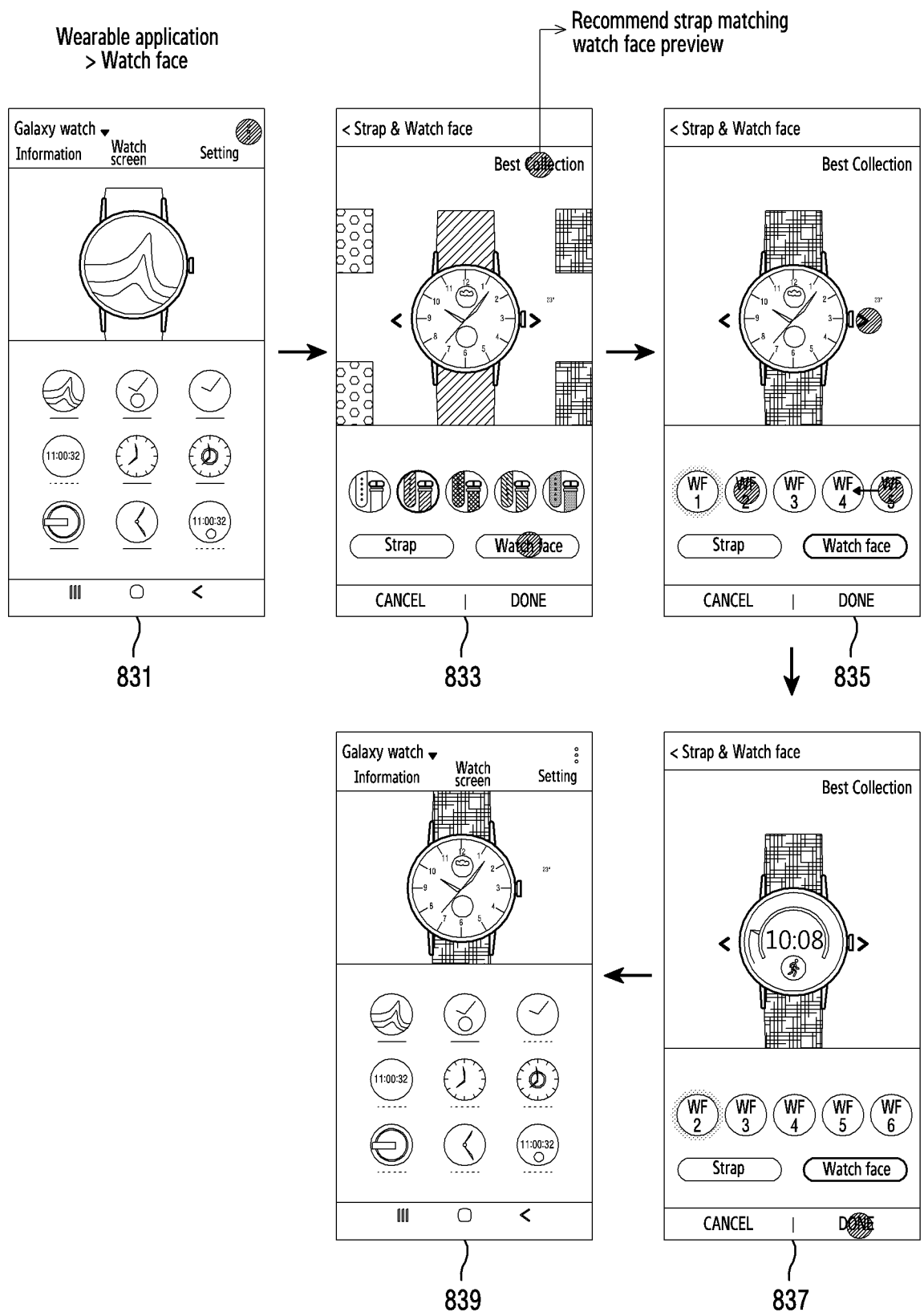
FIG. 8B is a diagram illustrating an example of determining a watch face preview and a strap according to various embodiments.

FIG. 8A is a diagram illustrating an example of determining a watch face preview and a strap according to various embodiments, and FIG. 8B is a diagram illustrating an example of determining a watch face preview and a strap according to various embodiments.

Referring to FIG. 8A, the electronic device 101 may execute a wearable application, and the wearable application may display a screen 811 related to a watch face. The electronic device 101 may display, via the screen 811, a watch face image applied to a current smart watch and a list of watch face previews stored in a memory of the electronic device 101. The electronic device 101 may execute a camera application and display a screen 813 in response to receiving an input for execution of the camera application. For example, the camera application may operate in a camera mode for a watch. The electronic device 101 may capture an image via the camera application, and may analyze the image. For example, the electronic device 101 may display a screen 815 showing that the captured image is being analyzed. In a procedure of image analysis, the electronic device 101 may identify image elements (e.g., resolution, visibility, complexity, color distribution, shape, material, representative colors, number of representative colors, brightness, saturation, tone, and lightness) of the captured image. The electronic device 101 may determine whether a watch face preview or a strap image, which matches a result of the image analysis, is identified in the memory. For example, the electronic device 101 may retrieve a strap image or a watch face preview, which has at least one image element matching that of the captured image, in the memory of the electronic device 101, and determine whether the watch face preview or the strap image, which matches the captured image, is identified in the memory of the electronic device 101. If the watch face preview or the strap image, which matches the captured image, is identified in the memory of the electronic device 101, the electronic device 101 may display a watch face preview 821 and strap images 823, which match the captured image, via the screen 817. If the watch face preview or the strap image, which matches the captured image, is not identified in the memory of the electronic device 101, the electronic device 101 may retrieve the watch face preview or the strap image, which matches the captured image, in the server to identify the watch face preview or the strap image, and may display a page including the identified watch face preview or strap image.

Referring to FIG. 8B, the electronic device 101 may execute a wearable application, and the wearable application may display a screen 831 related to a watch face. The electronic device 101 may display a screen 833 for selection of a watch face preview. On the screen 833, in addition to a selected watch face preview, strap images matching the watch face preview may be displayed and recommended. For example, the strap images displayed on the screen 833 may be strap images that straps stored in the memory of the electronic device 101 have. On a screen 835, the electronic device 101 may receive an input for selecting a watch face preview and/or a strap image, and may display a combination of the selected watch face preview and strap image. The electronic device 101 may receive an input for applying the watch face preview and/or strap image selected on the screen 837. For example, the electronic device 101 may transmit the watch face preview to a smart watch so that the smart watch displays a watch face image, in response to the input for applying the selected watch face preview. As another example, if the strap is equipped with a flexible display, the electronic device 101 may transmit, in response to the input for applying the selected strap image, the strap image to the smart watch so that the strap displays the strap image via the flexible display. The electronic device 101 may display the watch face image and/or the strap, which are applied to the current smart watch, via a screen 839 according to various inputs.

Figure 9:
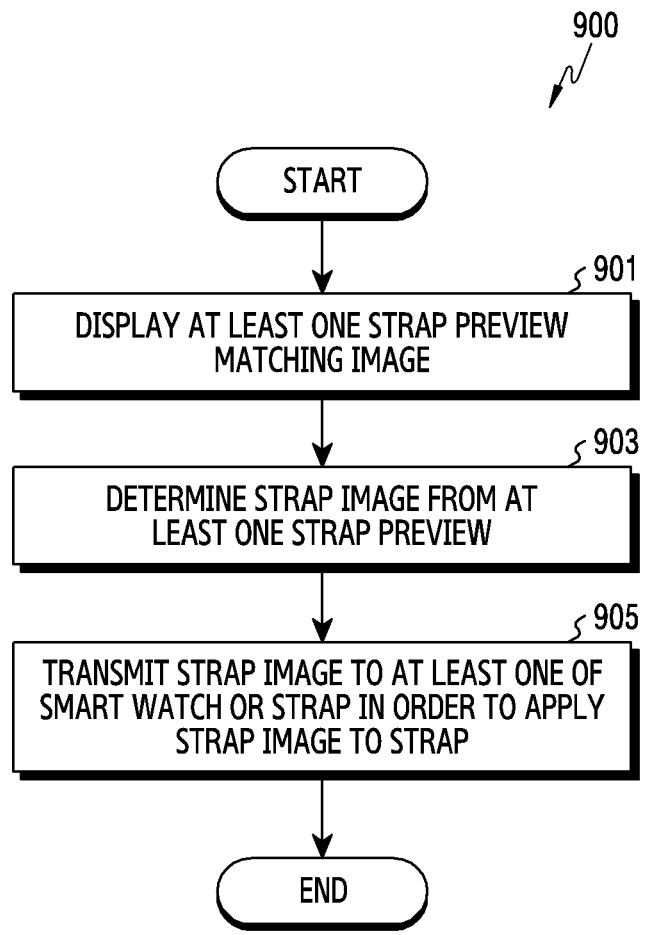
FIG. 9 is a flowchart illustrating an example operation for applying a strap image to a strap equipped with a flexible display.

FIG. 9 is a flowchart illustrating an example operation for applying a strap image to a strap equipped with a flexible display. Operations illustrated in a flowchart 900 of FIG. 9 may be performed by the electronic device 101 of FIG. 1 and/or the processor 120 of the electronic device 101.

Referring to FIG. 9, in operation 901, the processor 120 may display at least one strap preview matching an image (or a captured image) acquired using a camera (e.g., the camera module 190). To this end, the processor 120 may identify a strap preview matching the captured image. For example, the processor 120 may analyze the captured image, and may generate, according to a result of the image analysis, a strap preview matching the captured image by the same or a similar method as the method for generating a watch face preview, which is described in FIG. 4. As another example, the processor 120 may identify, according to the result of the image analysis, a strap image matching the captured image in a server or a memory (e.g., the memory 130) of the electronic device 101, by the same or a similar method as the method for identifying a strap image, which is described in FIG. 7.

In operation 903, the processor 120 may determine a strap image from at least one strap preview. For example, the processor 120 may determine, according to a user's input, the strap image by correcting resolution, material, brightness, saturation, tone, and/or lightness of the strap preview, or by modifying a shape and/or pattern of the strap preview. As another example, the processor 120 may determine the strap image without correcting the strap preview. In this case, the strap preview and the strap image may be identical.

In operation 905, the processor 120 may control a communication module (e.g., the communication module 190) to transmit the strap image to at least one of a smart watch or a strap, in order to apply the strap image to the strap. The processor 120 may transmit the strap image to at least one of the smart watch or the strap so that the strap displays the strap image via a flexible display. For example, if the strap is capable of performing a communication function, the processor 120 may control the communication module to directly transmit the strap image to the strap.

In various embodiments, the processor 120 may control an input device (e.g., the input device 150) to receive a user input indicating to apply the determined strap image to the smart watch, and to transmit, to the smart watch, the strap image together with an indication signal that indicates to apply the strap image to the smart watch, in response to reception of the user input. The indication signal that indicates to apply the strap image to the smart watch may include the strap image.

In FIG. 9, the processor 120 determines a strap image from a strap preview, but this is merely an illustrative example and various modifications are possible. For example, the processor 120 may transmit a strap preview matching a captured image to the smart watch, and the smart watch may determine a strap image from the strap preview (e.g., determining the strap image by correcting the strap preview or determining the strap image without modification).

Figure 10:
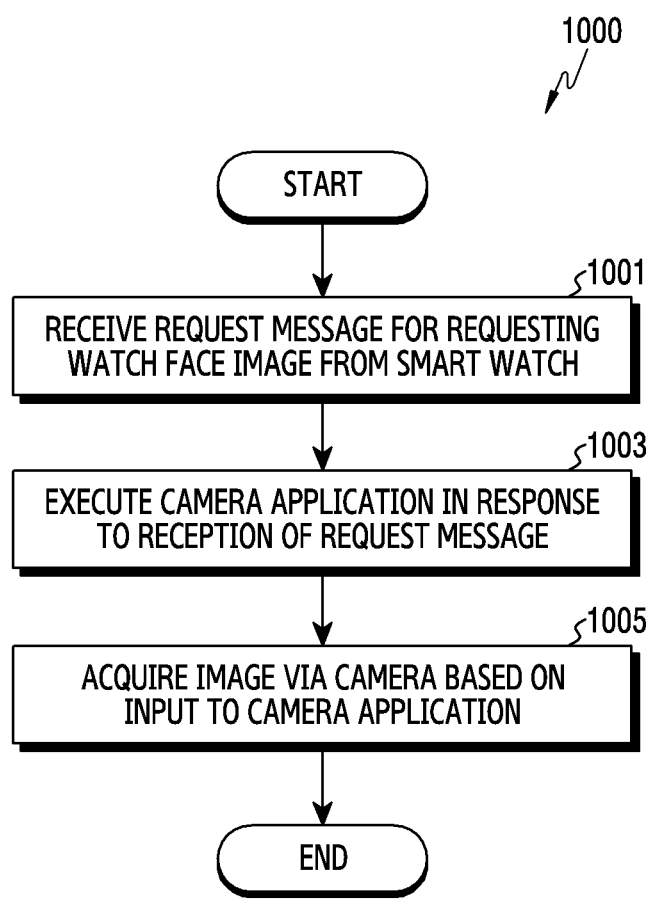
FIG. 10 is a flowchart illustrating an example operation for determining a watch face image based on a request from a smart watch according to various embodiments.

FIG. 10 is a flowchart illustrating an example operation for determining a watch face image based on a request from a smart watch according to various embodiments. Operations illustrated in a flowchart 1000 of FIG. 10 may be performed by the electronic device 101 of FIG. 1 and/or the processor 120 of the electronic device 101.

Referring to FIG. 10, in operation 1001, the processor 120 may control a communication module (e.g., the communication module 190) to receive a request message for requesting a watch face image from a smart watch (e.g., the electronic device 102). For example, the smart watch may capture an image, and may transmit, for determination of the watch face image, the request message for requesting the watch face image to the electronic device 101. In various embodiments, the request message may indicate the processor 120 (or the electronic device 101) to execute a camera application. The smart watch may call the camera application of the electronic device 101 via the request message. According to an embodiment, the smart watch may transmit the request message to the electronic device 101 in response to reception of an input (or an input for requesting the watch face image) for calling the camera application of the electronic device 101.

In operation 1003, the processor 120 may execute the camera application in response to reception of the request message. For example, the camera application may operate in a camera mode for a watch.

In operation 1005, the processor 120 may acquire an image via the camera based on an input to the camera application. For example, the processor 120 may acquire an image which may be a basis of the watch face image, using the camera. Although not illustrated, similar to FIG. 2, the processor 120 may identify a watch face preview matching an acquired image (or a captured image), may display the identified watch face preview, may determine a watch face image from the watch face preview, and may transmit the watch face image to a smart watch in order to apply the watch face image to the smart watch.

Figure 11:
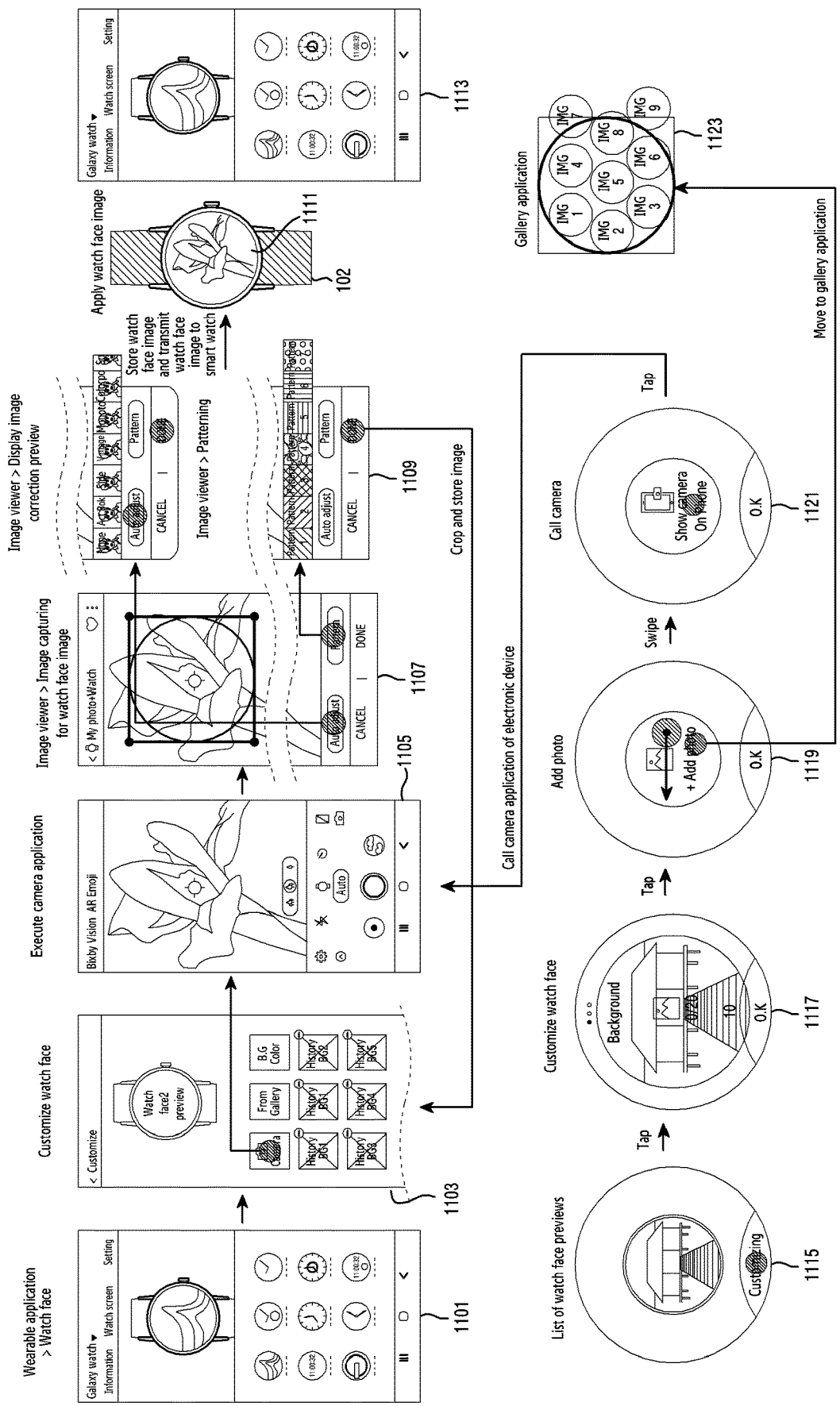
FIG. 11 is a diagram illustrating an example of applying a watch face image to a smart watch according to various embodiments.

FIG. 11 is a diagram illustrating an example of applying a watch face image to a smart watch according to various embodiments.

Referring to FIG. 11, the electronic device 101 may execute a wearable application, and the wearable application may display a screen 1101 related to a watch face. For example, the electronic device 101 may display, via the screen 1101, a watch face image applied to a current smart watch and a list of watch face previews stored in a memory of the electronic device 101.

The electronic device 101 may display a screen 1103 for customizing the watch face. The screen 1103 may include an icon and/or a button, via which an input for execution of a camera application may be received. For example, the electronic device 101 may execute the camera application in response to an input (e.g., a touch input) to the icon and/or the button, and may display a screen 1105. For example, the camera application may operate in a camera mode for a watch. The electronic device 101 may display, via the screen 1105, a camera preview for capturing an image that is to be a basis of a watch face image. The electronic device 101 may capture an image via the camera application, and may identify a watch face preview matching the captured image.

Furthermore, the electronic device 101 may execute an image viewer to display the watch face preview via a screen 1107. In the image view, the electronic device 101 may display a screen 1109 for correction of the watch face preview, and may determine the watch face image by correcting the watch face preview. For example, the electronic device 101 may correct resolution, material, brightness, saturation, tone, and/or lightness of the watch face preview, may modify a shape and/or pattern of the watch face preview, or may crop a partial area of the watch face preview. The described modification may by automatically performed regardless of a user input, or may be performed based on a user input via the screen 1109. As another example, the processor 120 may determine the watch face image without correcting the watch face preview. In this case, the watch face preview and the watch face image may be identical.

The electronic device 101 may receive an input for applying the watch face via the screen 1109. In response to reception of the input, the electronic device 101 may store the watch face image, and may transmit the watch face image to a smart watch (e.g., the electronic device 102) in order to apply the watch face image to the smart watch. When the watch face image is applied to the smart watch, the smart watch may display a watch face image 1111. The electronic device 101 may display the watch face image (e.g., the watch face image 1111) applied to the current smart watch. The electronic device 101 may store the watch face image in response to reception of the input for applying the watch face image via the screen 1109, and the stored watch face image may be added to the list of watch face previews to as to be displayed via the screen 1113.

According to various embodiments, the smart watch may determine a watch face image to be displayed via the watch face. The smart watch may display the list of watch face previews via a screen 1115, and may receive an input (e.g., a tap input) for customizing the watch face. In response to reception of the input, the smart watch may display a screen 1117 for customizing the watch face. The smart watch may display, via the screen 1117, the watch face preview for customizing, and may receive an input (e.g., a tap input) for configuring the watch face preview for customizing. In response to reception of the input via the screen 1117, the electronic device 101 may display a screen 1119 for adding a photo.

The electronic device 101 may receive, via the screen 1119, an input (e.g., a tap input) for moving to a gallery application of the smart watch and/or an input (e.g., a swipe input) for calling the camera application of the electronic device 101. For example, the smart watch may execute the gallery application, and may retrieve a watch face preview from a list 1123 of watch face previews identified in the gallery application. According to an embodiment, the smart watch may store the list 1123 of the watch face previews in a memory of the smart watch. As another example, the smart watch may transmit a request message to the electronic device 101 to call the camera application of the electronic device 101. According to an embodiment, the request message may be used to request a watch face image from the electronic device 101 and/or to indicate the electronic device 101 to execute the camera application. If the smart watch requests the camera application of the electronic device 101, the smart watch may display, via a screen 1121, a message indicating to use the camera of the electronic device 101. The electronic device 101 may execute the camera application and may display the screen 1105, in response to the call of the camera application by the smart watch (or in response to reception of the request message from the smart watch). The electronic device 101 may display, via the screen 1105, a camera preview for capturing an image that is to be a basis of a watch face image.

According to the described embodiments, the electronic device 101 may acquire image elements via image capturing, and may identify a watch face preview corresponding to the image elements. However, a method of acquiring image elements by the electronic device 101 via image capturing is merely an illustrative example, and various modifications are possible. For example, the electronic device 101 may acquire information relating to image elements from smart clothes without image capturing, and an embodiment relating thereto will be described in greater detail below with reference to FIG. 12.

Figure 12:
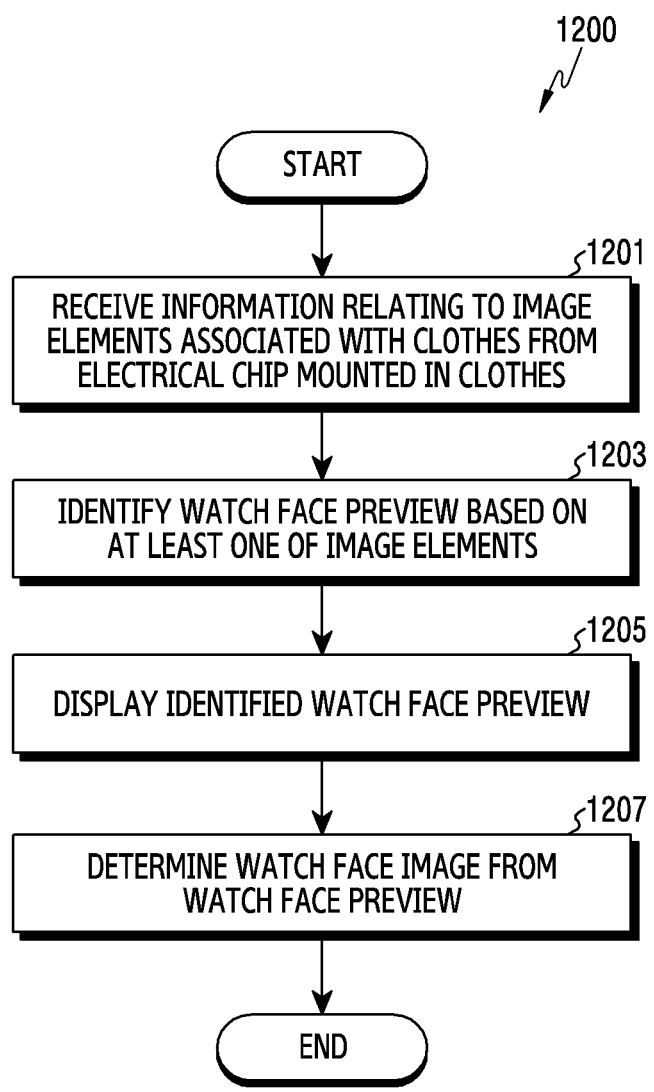
FIG. 12 is a flowchart illustrating an example operation for determining a watch face image based on information acquired from smart clothes according to various embodiments.

FIG. 12 is a flowchart illustrating an example operation for determining a watch face image based on information acquired from smart clothes. Operations illustrated in a flowchart 1200 of FIG. 12 may be performed by the electronic device 101 of FIG. 1 and/or the processor 120 of the electronic device 101.

Referring to FIG. 12, in operation 1201, the processor 120 may control a communication module (e.g., the communication module 190) to receive information relating to image elements associated with smart clothes from an electrical chip mounted in the smart clothes. For example, the information relating to image elements associated with the smart clothes may include at least one of visibility, complexity, color distribution, shape, material, representative colors, number of representative colors, brightness, saturation, tone, or lightness associated with an image of the smart clothes. In various embodiments, the image of the smart clothes may refer to an image representing a visual shape and/or color of the smart clothes.

In operation 1203, the processor 120 may identify a watch face preview based on at least one of image elements. The processor 120 may identify a watch face preview matching the smart clothes. For example, the processor 120 may generate the watch face preview by the same or a similar method as the method for generating a watch face preview, which is described in FIG. 4. As another example, the processor 120 may identify the watch face preview in a server or a memory (e.g., the memory 130) of the electronic device 101, by the same or a similar method as the method for identifying a watch face preview, which is described in FIG. 6.

In operation 1205, the processor 120 may control a display device (e.g., the display device 160) to display the identified watch face preview. The watch face preview may be matched with the smart clothes, and may reflect at least one of image elements of the smart clothes.

In operation 1207, the processor 120 may determine a watch face image from the watch face preview. For example, the processor 120 may determine, according to a user's input, the watch face image by correcting resolution, material, brightness, saturation, tone, and/or lightness of the watch face preview, or by modifying a shape and/or pattern of the watch face preview. As another example, the processor 120 may determine the watch face image without correcting the watch face preview. In this case, the watch face preview and the watch face image may be identical.

As described above, a method for operating an electronic device (e.g., the electronic device 101) according to various example embodiments may include: acquiring an image using a camera of the electronic device; displaying a watch face preview matching the acquired image on a display of the electronic device; determining a watch face image from the watch face preview; controlling a transceiver of the electronic device to transmit the watch face image to the smart watch; and applying the watch face image to a smart watch.

In various example embodiments, the method may further include: identifying a color distribution of the image; identifying representative colors in the image based on the color distribution; and applying at least one of the representative colors to a shape for the watch face image to generate the watch face preview.

In various example embodiments, the method may further include identifying, based on at least one of resolution of the image, visibility of the image, complexity of the image, the shape of the image, the number of the representative colors, or whether the watch face image includes watch hands, the shape for the watch face image, wherein generating of the watch face preview may include applying, to the shape for the watch face image, at least one of material, brightness, saturation, lightness, or tone of each object included in the image.

In various example embodiments, the method may further include identifying the shape for the watch face image, which corresponds to the number of the representative colors.

In various example embodiments, the method may further include identifying the shape for the watch face image, in which at least one object, the size of which is equal to or smaller than a threshold size, is deleted from the shape of the image, based on the visibility of the image and the complexity of the image.

In various example embodiments, the method may further include determining whether at least one watch face preview matching the image is identified in a memory of the electronic device, wherein displaying of the watch face preview includes, based on determining that the at least one watch face preview is identified in the memory, displaying the watch face preview among the identified at least one watch face preview on the display.

In various example embodiments, the method may further include: determining whether at least one strap image matching the image is identified in the memory of the electronic device; and based on determining that the at least one strap image is identified in the memory, displaying the identified at least one strap image on the display.

In various example embodiments, a strap related to the smart watch may include a flexible display, and the method may further include: displaying a strap preview matching the image on the display; determining a strap image from the strap preview; and in order to apply the strap image to the strap, controlling the transceiver to transmit the strap image to at least one of the smart watch or the strap.

In various example embodiments, the method may further include: determining whether at least one strap image matching the image is identified in the memory of the electronic device; based on determining that the at least one strap image is not identified in the memory, identifying the at least one strap image in a server related to the smart watch; and displaying a page including the identified at least one strap image on the display.

In various example embodiments, the memory may store a list of straps and the at least one strap image corresponding to each of the straps, and the straps included in the list may be added to the list based on at least one of information indicating that the straps are purchased via a web site or an application related to the smart watch, information indicating that the straps are mounted on a main body of the smart watch, or an input for adding the straps to the list.

In various example embodiments, the method may further include: controlling the transceiver to receive a request message for requesting the watch face image from the smart watch; and in response to reception of the request message, executing a camera application, wherein acquiring of the image includes acquiring the image via the camera based on an input to the camera application.

In various example embodiments, the method may further include: controlling the transceiver to receive information relating to image elements associated smart clothes from an electrical chip mounted on the smart clothes; and identifying the watch face preview based on at least one of the image elements.

The electronic device according to various example embodiments may be at least one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. One of ordinary skill in the art will understand that various changes in form and detail may be made without departing from the spirit and scope of the disclosure, including the appended claims and their equivalents.

What is claimed is:

1. A method of operating an electronic device, the method comprising:
   acquiring an image using a camera of the electronic device;
   obtaining a watch face preview having a patterned shape based on image analysis of the image;
   displaying the watch face preview on a display of the electronic device;
   obtaining a watch face image corresponding to the watch face preview; and
   controlling a transceiver of the electronic device to transmit the watch face image to a smart watch, wherein the watch face image is to be applied to a display of the smart watch.

2. The method of claim 1, wherein the watch face preview is obtained based on at least one image element by:
   analyzing the image to identify the at least one image element;
   patterning a shape of the image; and
   generating the watch face preview by applying the at least one image element to the patterned shape.

3. The method of claim 2, wherein the image analyzing comprises:
   identifying a color distribution of the image; and
   identifying representative colors in the image as the at least one image element based on the color distribution; and
   wherein the generating of the watch face preview comprises:
      generating the watch face preview by applying at least one of the representative colors to the patterned.

4. The method of claim 3, wherein the patterning of the shape of the image further comprises:
   patterning the shape of the image based on at least one of resolution of the image, visibility of the image, complexity of the image, shape of the image, number of the representative colors, or the watch face image including watch hands,
   wherein the generating of the watch face preview further comprises:
      generating the watch face preview by applying at least one of material, brightness, saturation, lightness, or tone of each object included in the image to the patterned shape.

5. The method of claim 1, further comprising:
   determining whether at least one watch face preview matching the image is identified in a memory of the electronic device,
   wherein the displaying of the watch face preview comprises displaying, on the display, the identified at least one watch face preview based on determining that the at least one watch face preview is identified in the memory.

6. The method of claim 1, further comprising:
   determining whether at least one strap image matching the image is identified in a memory of the electronic device; and
   displaying the identified at least one strap image on the display based on determining that the at least one strap image is identified in the memory.

7. The method of claim 1, wherein a strap related to the smart watch comprises a flexible display, further comprising:
   displaying a strap preview matching the image on the display;
   determining a strap image from the strap preview; and
   controlling the transceiver to transmit the strap image to at least one of the smart watch or the strap.

8. The method of claim 1, further comprising:
   determining whether at least one strap image matching the image is identified in a memory of the electronic device;
   identifying the at least one strap image in a server related to the smart watch based on determining that the at least one strap image is not identified in the memory; and
   displaying a page including the identified at least one strap image on the display.

9. The method of claim 8, wherein the memory stores a list of straps and the at least one strap image corresponding to each of the straps, and the straps included in the list are added to the list based on at least one of information indicating that the straps are purchased via a website or an application related to the smart watch, information indicating that the straps are mounted on a main body of the smart watch, or an input for adding the straps to the list.

10. The method of claim 1, further comprising:
    controlling the transceiver to receive a request message for requesting the watch face image from the smart watch; and
    executing a camera application in response to receiving the request message, wherein the acquiring of the image comprises acquiring the image via the camera based on an input to the camera application.

11. The method of claim 1, further comprising:
    controlling the transceiver to receive information relating to image elements associated with smart clothes from an electrical chip mounted in the smart clothes; and
    identifying the watch face preview based on at least one of the image elements.

12. An electronic device comprising:
    a processor;
    a camera;
    a memory;
    a display; and
    a transceiver,
    wherein the processor is configured to control the electronic device to:
       acquire an image using the camera;
       obtain a watch face preview having a patterned shape based on image analysis of the image;
       display the watch face preview on the display;
       obtain a watch face image corresponding to the watch face preview; and
       control the transceiver to transmit the watch face image to a smart watch, wherein the watch face image is to be applied to a display of the smart watch.

13. The electronic device of claim 12, wherein the watch face preview is obtained based on at least one image element by:
    analyzing the image to identify the at least one image element;

patterning a shape of the image; and
generating the watch face preview by applying the at least one image element to the patterned shape.

14. The electronic device of claim 13, wherein the processor is configured to control the electronic device to:
identify, a color distribution of the image;
identify representative colors in the image as the at least one image element based on the color distribution; and
generate the watch face preview by applying at least one of the representative colors to the patterned shape.

15. The electronic device of claim 14, wherein the processor is configured to control the electronic device to:
pattern the shape of the image based on at least one of resolution of the image, visibility of the image, complexity of the image, shape of the image, number of the representative colors, or the watch face image including watch hands; and
generate the watch face preview by applying at least one of material, brightness, saturation, lightness, or tone of each object included in the image to the patterned shape.

16. The electronic device of claim 12, wherein the processor is configured to control the electronic device to:
determine whether at least one watch face preview matching the image is identified in the memory; and
display, on the display, the identified at least one watch face preview based on determining that the at least one watch face preview is identified in the memory.

17. The electronic device of claim 12, wherein the processor is configured to control the electronic device to:
determine whether at least one strap image matching the image is identified in the memory; and
display the identified at least one strap image on the display based on determining that the at least one strap image is identified in the memory.

18. The electronic device of claim 12, wherein a strap related to the smart watch comprises a flexible display, and the processor is configured to control the electronic device to:
display a strap preview matching the image on the display;
determine a strap image from the strap preview; and
control the transceiver to transmit the strap image to at least one of the smart watch or the strap.

19. The electronic device of claim 12, wherein the processor is configured to control the electronic device to:
determine whether at least one strap image matching the image is identified in the memory;
identify the at least one strap image in a server related to the smart watch based on determining that the at least one strap image is not identified in the memory; and
display a page comprising the identified at least one strap image on the display.

20. The electronic device of claim 19, wherein:
the memory stores a list of straps and the at least one strap image corresponding to each of the straps; and
the straps included in the list are added to the list based on at least one of information indicating that the straps are purchased via a website or an application related to the smart watch, information indicating that the straps are mounted on a main body of the smart watch, or an input for adding the straps to the list.

21. The electronic device of claim 12,
wherein the processor is configured to control the electronic device to:
control the transceiver to receive a request message for requesting the watch face image from the smart watch;
execute a camera application in response to receiving of the request message; and
acquire the image via the camera based on an input to the camera application.

22. The electronic device of claim 12, wherein the processor is configured to control the electronic device to:
control the transceiver to receive information relating to image elements associated with smart clothes from an electrical chip mounted in the smart clothes; and
identify the watch face preview based on at least one of the image elements.

* * * * *